(12) United States Patent
Aronov et al.

(10) Patent No.: US 11,128,152 B2
(45) Date of Patent: Sep. 21, 2021

(54) SYSTEMS AND METHODS FOR ADAPTIVE FAST-CHARGING FOR MOBILE DEVICES AND DEVICES HAVING SPORADIC POWER-SOURCE CONNECTION

(71) Applicant: StoreDot Ltd., Herzeliya (IL)

(72) Inventors: Daniel Aronov, Netanya (IL); Leonid Krasovitsky, Rishon LeTzion (IL)

(73) Assignee: StoreDot Ltd., Herzeliya (IL)

( * ) Notice: Subject to any disclaimer, the term of this patent is extended or adjusted under 35 U.S.C. 154(b) by 0 days.

(21) Appl. No.: 15/678,143

(22) Filed: Aug. 16, 2017

(65) Prior Publication Data

US 2017/0373513 A1     Dec. 28, 2017

Related U.S. Application Data

(63) Continuation-in-part of application No. 15/287,292, filed on Oct. 6, 2016, now abandoned, which is a
(Continued)

(51) Int. Cl.
*H02J 7/00* (2006.01)
*H02J 7/34* (2006.01)

(52) U.S. Cl.
CPC ............ *H02J 7/0021* (2013.01); *H02J 7/007* (2013.01); *H02J 7/342* (2020.01); *H02J 7/345* (2013.01);
(Continued)

(58) Field of Classification Search
CPC .......... H02J 7/007; H02J 7/0021; H02J 7/342; H02J 7/345; H02J 7/0048; H02J 7/0049; H02J 7/0036; H02J 7/0068; H02J 7/0013
(Continued)

(56) References Cited

U.S. PATENT DOCUMENTS

| | | |
|---|---|---|
| 3,778,254 A | 12/1973 | Cole et al. |
| 5,055,763 A | 10/1991 | Johnson et al. |
| | (Continued) | |

FOREIGN PATENT DOCUMENTS

| | | |
|---|---|---|
| CA | 2161076 | 4/1996 |
| CA | 2258026 | 12/1997 |
| | (Continued) | |

OTHER PUBLICATIONS

Kan et al., "Battery-Capacitor combinations in photovoltaic powered products", Journal of Power Sources, vol. 162, No. 2, pp. 971-974, Nov. 22, 2006.
(Continued)

*Primary Examiner* — Richard Isla
*Assistant Examiner* — Mohammed J Sharief
(74) *Attorney, Agent, or Firm* — Reches Patent

(57) ABSTRACT

The present invention discloses systems and methods for adaptive fast-charging for mobile devices and devices having sporadic power-source connection. Methods include the steps of: firstly determining whether a supercapacitor of a device is charged; upon detecting the supercapacitor is charged, secondly determining whether a battery of the device is charged; and upon detecting the battery is not charged, firstly charging the battery from the supercapacitor. Preferably, the step of firstly determining includes whether the supercapacitor is partially charged, and the step of secondly determining includes whether the battery is partially charged. Preferably, the step of firstly charging is adaptively regulated to perform a task selected from the group consisting of: preserving a lifetime of the battery by controlling a current to the battery, and discharging the supercapacitor in order to charge the battery. Preferably, the discharging enables the supercapacitor to be subsequently recharged.

20 Claims, 17 Drawing Sheets

Related U.S. Application Data continuation-in-part of application No. 14/675,771, filed on Apr. 1, 2015, now abandoned.

(60) Provisional application No. 61/976,551, filed on Apr. 8, 2014, provisional application No. 62/238,515, filed on Oct. 7, 2015.

(52) U.S. Cl.
CPC ........... *H02J 7/0036* (2013.01); *H02J 7/0048* (2020.01); *H02J 7/0049* (2020.01)

(58) Field of Classification Search
USPC ........................................................ 320/128
See application file for complete search history.

(56) References Cited

U.S. PATENT DOCUMENTS

| | | | |
|---|---|---|---|
| 5,057,761 A | 10/1991 | Felegyhazi, Sr. | |
| 6,051,340 A | 4/2000 | Kawakami et al. | |
| 6,118,250 A | 9/2000 | Hutchison, IV et al. | |
| 6,216,480 B1 | 4/2001 | Camus et al. | |
| 6,242,888 B1 | 6/2001 | Cerf | |
| 6,492,061 B1 | 12/2002 | Gauthier et al. | |
| 6,509,717 B2* | 1/2003 | Lee | H02J 7/0013 320/116 |
| 6,541,156 B1 | 4/2003 | Fuse et al. | |
| 6,558,438 B1 | 5/2003 | Satoh et al. | |
| 6,599,662 B1 | 7/2003 | Chiang et al. | |
| 7,192,673 B1 | 3/2007 | Ikeda et al. | |
| 7,656,120 B2* | 2/2010 | Neu | H01M 2/1066 320/112 |
| 7,906,238 B2 | 3/2011 | Le | |
| 7,956,576 B2* | 6/2011 | Neu | G06F 1/1632 320/114 |
| 8,021,791 B1 | 9/2011 | Plichta et al. | |
| 8,945,774 B2 | 2/2015 | Coowar et al. | |
| 8,951,673 B2 | 2/2015 | Wessells et al. | |
| 9,406,927 B1 | 8/2016 | Burshtain et al. | |
| 9,472,804 B2 | 10/2016 | Burshtain et al. | |
| 9,583,761 B2 | 2/2017 | Burshtian et al. | |
| 9,705,332 B2* | 7/2017 | Oudalov | H02J 3/32 |
| 9,728,776 B2 | 8/2017 | Burshtain et al. | |
| 10,005,449 B2* | 6/2018 | Takizawa | B60W 10/06 |
| 10,050,449 B2* | 8/2018 | Hall | H01R 25/142 |
| 10,090,682 B2* | 10/2018 | Snyder | H02J 7/0022 |
| 2001/0017531 A1* | 8/2001 | Sakakibara | H02J 7/00036 320/106 |
| 2002/0122980 A1 | 9/2002 | Fleischer et al. | |
| 2001/0146623 | 10/2002 | Suzuki et al. | |
| 2003/0039889 A1 | 2/2003 | Park et al. | |
| 2004/0033360 A1 | 2/2004 | Armand et al. | |
| 2004/0155631 A1 | 8/2004 | Ishizu | |
| 2004/0219428 A1 | 11/2004 | Nagayama | |
| 2005/0019659 A1 | 1/2005 | Shiozaki et al. | |
| 2005/0052161 A1 | 3/2005 | Scamard | |
| 2005/0093512 A1 | 5/2005 | Mader et al. | |
| 2005/0194934 A1 | 9/2005 | Iijima et al. | |
| 2007/0003837 A1 | 1/2007 | Nishimura et al. | |
| 2007/0281216 A1 | 12/2007 | Petrat et al. | |
| 2007/0284159 A1 | 12/2007 | Takami et al. | |
| 2008/0048621 A1* | 2/2008 | Yun | H02J 7/0004 320/136 |
| 2008/0093143 A1* | 4/2008 | Harrison | B60H 1/3208 180/165 |
| 2008/0143300 A1 | 6/2008 | Yoshida | |
| 2008/0224652 A1 | 9/2008 | Zhu et al. | |
| 2008/0248386 A1 | 10/2008 | Obrovac et al. | |
| 2009/0111020 A1 | 4/2009 | Yamaguchi et al. | |
| 2009/0179181 A1 | 7/2009 | Zhang et al. | |
| 2009/0317637 A1 | 12/2009 | Luhrs et al. | |
| 2010/0007310 A1 | 1/2010 | Kawamoto et al. | |
| 2010/0066309 A1 | 3/2010 | Labrunie et al. | |
| 2010/0134065 A1* | 6/2010 | Iida | B60L 3/04 320/103 |
| 2010/0134305 A1* | 6/2010 | Lu | H02J 7/0021 340/636.13 |
| 2010/0159331 A1 | 6/2010 | Lee et al. | |
| 2010/0190059 A1 | 7/2010 | Graetz et al. | |
| 2011/0084845 A1 | 4/2011 | Krug | |
| 2011/0156660 A1 | 6/2011 | Cheng et al. | |
| 2011/0257001 A1 | 10/2011 | Negishi | |
| 2011/0260689 A1* | 10/2011 | Kano | H02J 7/0022 320/128 |
| 2012/0045696 A1 | 2/2012 | Herle | |
| 2012/0088155 A1 | 4/2012 | Yushin et al. | |
| 2012/0145485 A1 | 6/2012 | McCabe et al. | |
| 2012/0164531 A1 | 6/2012 | Chen et al. | |
| 2012/1031948 | 12/2012 | Shah Rakesh | |
| 2013/0040226 A1 | 2/2013 | Yamauchi et al. | |
| 2013/0059174 A1 | 3/2013 | Zhamu | |
| 2013/0088082 A1 | 4/2013 | Kang | |
| 2013/0224594 A1 | 8/2013 | Yushin et al. | |
| 2013/0229153 A1* | 9/2013 | Sarkar | B60L 11/1809 320/130 |
| 2013/0260285 A1 | 10/2013 | Yamauchi et al. | |
| 2013/0266875 A1 | 10/2013 | Matsumoto et al. | |
| 2014/0004426 A1 | 1/2014 | Kerlau et al. | |
| 2014/0083443 A1 | 3/2014 | Liu et al. | |
| 2014/0113202 A1 | 4/2014 | Sun et al. | |
| 2014/0145506 A1* | 5/2014 | Lu | H02J 7/0054 307/66 |
| 2014/0195826 A1* | 7/2014 | Wojcik | G06F 1/1632 713/300 |
| 2014/0295267 A1 | 10/2014 | Wang | |
| 2015/0017515 A1 | 1/2015 | Jeon et al. | |
| 2015/0046110 A1 | 2/2015 | Joe et al. | |
| 2015/0214762 A1 | 7/2015 | Hung et al. | |
| 2015/0221977 A1 | 8/2015 | Hallac et al. | |
| 2015/0367747 A1 | 12/2015 | Decker et al. | |
| 2016/0036045 A1 | 2/2016 | Burshtain et al. | |
| 2016/0064773 A1 | 3/2016 | Choi et al. | |
| 2016/0104882 A1 | 4/2016 | Yushin et al. | |
| 2016/0149220 A1 | 5/2016 | Uhm et al. | |
| 2016/0264124 A1 | 9/2016 | Hotta | |
| 2016/0372753 A1 | 12/2016 | Fukasawa et al. | |
| 2017/0012279 A1 | 1/2017 | Burshtain et al. | |
| 2017/0207451 A1 | 7/2017 | Burshtian et al. | |
| 2017/0294643 A1 | 10/2017 | Burshtian et al. | |
| 2017/0294644 A1 | 10/2017 | Burshtian et al. | |
| 2017/0294648 A1 | 10/2017 | Burshtian et al. | |
| 2017/0294649 A1 | 10/2017 | Burshtian et al. | |
| 2017/0294680 A1 | 10/2017 | Burshtain et al. | |
| 2017/0294681 A1 | 10/2017 | Burshtain et al. | |
| 2017/0294687 A1 | 10/2017 | Burshtian et al. | |
| 2018/0050602 A1 | 2/2018 | Aronov | |
| 2018/0108937 A1 | 4/2018 | Drach et al. | |
| 2018/0301757 A1 | 10/2018 | Burshtian et al. | |

FOREIGN PATENT DOCUMENTS

| | | |
|---|---|---|
| CN | 1533008 | 9/2004 |
| CN | 101734675 | 6/2010 |
| CN | 103701164 | 4/2014 |
| CN | 104577081 | 4/2015 |
| EP | 1453176 | 9/2004 |
| EP | 1999818 | 12/2008 |
| EP | 2590050 | 5/2013 |
| EP | 2889097 | 7/2015 |
| JP | 2002-056891 | 2/2002 |
| JP | 2006-216276 | 8/2006 |
| JP | 2007-323837 | 12/2007 |
| JP | 2008-053092 | 3/2008 |
| JP | 2008-154370 | 7/2008 |
| JP | 2010-104223 | 5/2010 |
| JP | 2012/131674 | 7/2012 |
| JP | 2014002834 | 1/2014 |
| KR | 2004-0071636 | 8/2004 |
| KR | 2012-121265 | 10/2012 |
| WO | WO 2006/112698 | 10/2006 |
| WO | WO 2013/040356 | 3/2013 |

(56) References Cited

FOREIGN PATENT DOCUMENTS

| WO | WO 2014068036 | 5/2014 |
|----|---------------|--------|
| WO | WO2015016563 | 2/2015 |
| WO | WO 2015032950 | 3/2015 |
| WO | WO2015145521 | 10/2015 |
| WO | WO 2016/031082 | 3/2016 |
| WO | WO2016031082 | 3/2016 |

OTHER PUBLICATIONS

Buiel et al., "Development of ultrathin ultracapacitors for enhanced lithium batteries in portable electronic applications", published at the Capacitor and Resistor Technology Symposium (CARTS International 2013), Mar. 26, 2013.

Chaudhuri et al. "Core/shell nanoparticles: classes, properties, synthesis mechanisms, characterization, and applications" Chemical Reviews, vol. 112, No. 4, pp. 2373-2433, 2012.

Wu et al. "Hydrogen Storage in Pillared Li-Dispersed Boron Carbide Nanotubes", J. Phys. Chem. C, 2008, vol. 112, No. 22, pp. 8458-8463.

Secrist "Compound Formation in the Systems Lithium-Carbon and Lithium-Boron", Journal of the American Ceramic Society, Oct. 1967, vol. 50, No. 10, pp. 520-523.

Suzuki et al. "Silicon nitride thin film electrode for lithium-ion batteries", Journal of Power Sources, 2013, vol. 231, pp. 186-189.

Konno et al. "Application of Si—C—O glass-like compounds as negative electrode materials for lithium hybrid capacitors", Journal of Power Sources, 2009, vol. 191, No. 2, pp. 623-627.

Hu et al. "Silicon/graphene based nanocomposite anode: large-scale production and stable high capacity for lithium ion batteries", Journal of Materials Chemistry A, 2014, vol. 2, No. 24, pp. 9118-9125.

Cui et al. "Carbon-Silicon Core-Shell Nanowires as High Capacity Electrode for Lithium Ion Batteries", Nano Letters, May 8, 2009, vol. 9, No. 9, pp. 3370-3374.

Kennedy et al. "High-Performance Germanium Nanowire-Based Lithium-Ion Battery Anodes Extending over 1000 Cycles Through in Situ Formation of a Continuous Porous Network", NANO Letters, 2014, vol. 14, pp. 716-723.

Hwang et al. "Mesoporous Ge/GeO2/Carbon Lithium-Ion Battery Anodes with High Capacity and High Reversibility", ACS NANO, Apr. 13, 2015, vol. 9, No. 5, pp. 5299-5309.

Balomenos et al. "Exergy Analysis of Metal Oxide Carbothemic Reduction under Vacuum—Sustainability prospects", International Journal of Thermodynamics, Jun. 4, 2012, vol. 15, No. 3, pp. 141-148.

Barton et al. "The Reduction of Germanium Dioxide With Graphite at High Temperatures", Journal of the Less-Common Metals, 1970, vol. 22, pp. 11-17.

Nitta et al. "High-Capacity Anode Materials for Lithium-Ion Batteries: Choice of Elements and Structures for Active Particles", Particle Systems Characterization, 2014, vol. 31, pp. 317-336.

Chung et al. "Electronically conductive phospho-olivines as lithium storage electrodes", nature materials, Oct. 22, 2002, vol. 1, pp. 123-128.

Kennedy et al. "Nanowire Heterostructures Comprising Germanium Stems and Silicon Branches as High-Capacity Li-Ion Anodes with Tunable Rate Capability", ACS Nano, Jun. 30, 2015, vol. 9, No. 7, pp. 7456-7465.

Aldrich (Sigma-Aldrich MSDS Lithium hexafluorophosphate {http://www.sigmaaldrich.com/MSDS/MSDS/DisplayMSDSPage.do?country-US&language-en&productNumber=450227&brand=ALDRICH} Printed Dec. 19, 2017).

Buzzeo et al. "Non-Haloaluminate Room-Temperature Ionic Liquids in Electrochemistry—A Review", ChemPhysChem, 2004, vol. 5, pp. 1106-1120.

Kyotani et al. "Remarkable performance improvement of inexpensive ball-milled Si nanoparticles by carbon-coating for Li-ion batteries", Journal of Power Sources, Jul. 1, 2016, vol. 319, pp. 99-103.

Son et al. "Silicon carbide-free graphene growth on silicon for lithium-ion battery with high volumetric energy density", Nature Communications, Jun. 25, 2015, vol. 6, No. 7393, pp. 1-8.

Tow et al. "A Study of Highly Oriented Pyrolytic Graphite as a Model for the Graphite Anode in Li-Ion Batteries", Journal of the Electrochemical Society, 1999, vol. 146, No. 3, pp. 824-832.

Qi et al. "Threefold Increase in the Young's Modulus of Graphite Negative Electrode during Lithium Intercalation", Journal of The Electrochemical Society, 2010, vol. 157, No. 5, pp. A558-A566.

Qi et al. "Lithium Concentration Dependent Elastic Properties of Battery Electrode Materials from First Principles Calculations", Journal of the Electrochemical Society, 2014, vol. 161, No. 11, pp. F3010-F3018.

Wen et al. "Thermodynamic and Mass Transport Properties of "LiAl"", Solid-State Science and Technology, Dec. 1979, vol. 126, No. 12, pp. 2258-2266.

Wu et al. "Stable Li-ion battery anodes by in-situ polymerization of conducting hydrogel to conformally coat silicon nanoparticles", Nature Communications, Jun. 4, 2013, vol. 4, No. 1943, pp. 1-6.

Sun et al. "Silicon/Wolfram Carbide@Graphene composite: enhancing conductivity and structure stability in amorphous-silicon for high lithium storage performance", Electrochimica Acta, Jun. 25, 2016, vol. 191, pp. 462-472.

Cho et al. "Zero-Strain Intercalation Cathode for Rechargeable Li-Ion Cell", Angewandte Chemie, 2001, vol. 40, No. 18, pp. 3367-3369.

Ngo et al. "Mass-scalable synthesis of 3D porous germanium-carbon composite particles as an ultra-high rate anode for lithium ion batteries", Energy & Environmental Science, 2015, vol. 8, pp. 3577-3588.

Billaud et al. "Synthesis and electrical resistivity of lithium-pyrographite intercalation compounds (stages I, II and III)", Materials Research Bulletin, Jul. 1979, vol. 14, No. 7, pp. 857-864.

Guriparti et al. "Review on recent progress of nanostructured anode materials for Li-ion batteries", Journal of Power Sources, 2014, vol. 257, pp. 421-443.

Scott et al. "Ultrathin Coatings on Nano-LiCoO2 for Li-Ion Vehicular Applications", NANO Letters, 2011, vol. 11, pp. 414-418.

Chen et al. "Conductive Rigid Skeleton Supported Silicon as High-Performance Li-Ion Battery Anodes", NANO Letters, 2012, vol. 12, pp. 4124-4130.

Kim et al. "Electrochemical properties of carbon-coated Si/B composite anode for lithium ion batteries", Journal of Power Sources, 2009, vol. 189, pp. 108-113.

Wang et al. "Boron-doped carbon nanotube-supported Pt nanoparticles with improved CO tolerance for methanol electro-oxidation", Phys. Chem. Chem. Phys., 2012, vol. 14, pp. 13910-13913.

Wang et al. "The dimensionality of Sn anodes in Li-ion batteries", materialstoday, Dec. 2012, vol. 15, No. 12, pp. 544-552.

Bhandavat et al. "Improved Electrochemical Capacity of Precursor-Derived Si(B)CN-Carbon Nanotube Composite as Li-Ion Battery Anode", ACS Applied Materials & Interfaces, Oct. 2, 2012, vol. 4, pp. 5092-5097.

Bhandavat et al. "Synthesis, Characterization, and High Temperature Stability of Si(B) CN-Coated Carbon Nanotubes Using a Boron-Modified Poly(ureamethylvinyl)Silazane Chemistry", Journal of the American Ceramic Society, 2012, vol. 95, No. 5, pp. 1536-1543.

Nowotny et al. "Investigations in the three systems: Molybdenum-Silicon-boron, tungsten-Silicon-boron and in which System: VS12—TaSi2", MB. Chem., 1956, vol. 88, No. 2, pp. 179-182.

Kasavajjula et al. "Nano- and bulk-silicon-based insertion anodes for lithium-ion secondary cells", Journal of Power Sources, 2007, Vo. 163, pp. 1003-1039.

Yom et al. "Improved electrochemical behavior of Tungsten Coated Silicon Monoxide-Carbon composite anode in lithium ion battery",Abstract #1041, The Electrochemical Society 224th ECS Meeting, Oct. 27-Nov. 1, 2013.

Liu et al. "A pomegranate-inspired nanoscale design for large-volume-change lithium battery anodes", Nature Nanotechnology, Mar. 2014, vol. 9, pp. 187-192.

(56) References Cited

OTHER PUBLICATIONS

Tao et al. "Hollow core-shell structured Si/C nanocomposites as high-performance anode materials for lithium-ion batteries", Nanoscale, 2014, vol. 6, pp. 3138-3142.
Song et al. "Is Li4Ti5O12 a solid-electrolyte-interphase-free electrode material in Li-ion batteries? Reactivity between the Li4Ti5O12 electrode and electrolyte", Journal of Materials Chemistry A, 2014, vol. 2, pp. 631-636.
Byeon "Multifunctional metal-polymer nanoagglomerates from singlepass aerosol self-assembly", Scientific Reports, Aug. 10, 2016, pp. 1-8.
Dhawan et al. "Development of Highly Hydrophobic and Anticorrosive Conducting Polymer Composite Coating for Corrosion Protection in Marine Environment", American Journal of Polymer Science, 2015, vol. 5, No. 1A, pp. 7-17.
Skameche et al. "Electrodeposition, electrochemical and optical properties of poly(3-cylopropylmethylpyrrole), a new, hydrophobic, conducting polymer film", American Institute of Physics, 1996, vol. 354, No. 75, pp. 75-81.
Zhao et al. "Artificial Solid Electrolyte Interphase-Protected LixSi Nanoparticles: An Efficient and Stable Prelithiation Reagent for Lithium-Ion Batteries", Journal of the American Chemical Society, Jun. 19, 2015, vol. 137, No. 75, pp. 8372-8375.
Gay et al. "Performance Characteristics of Solid Lithium-Aluminium Alloy Electrodes", Journal of the Electrochemical Society, Nov. 1976, vol. 123, No. 11, pp. 1591-1596.
Li et al. "High-rate aluminium yolk-shell nanoparticle anode for Li-ion battery with long cycle life and ultrahigh capacity" Nature Communications, Aug. 5, 2015, pp. 1-7.
Maoz et al. "Site-Targeted Interfacial Solid-Phase Chemistry: Surface Functionalization of Organic Monolayers via Chemical Transformations Locally Induced at the Boundary between Two Solids", Angewandte Chemie, 2016, vol. 55, pp. 12366-12371.
Molino et al. "Hydrophobic conducting polymer films from post deposition thiol exposure", Synthetic Metals 162, 2012, pp. 1464-1470.
Jankovski et al. "New boron based salts for lithium-ion batteries using conjugated ligands", Physical Chemistry Chemical Physics, May 19, 2016, vol. 18, pp. 16274-16280.
Aurbach et al. "A short review of failure mechanisms of lithium metal and lithiated graphite anodes in liquid electrolyte solutions", Solid State Ionics, 2002, vol. 148, pp. 405-416.
He et al. "Effect of solid electrolyte interface (SEI) film on cyclic performance of Li4Ti5O12 anodes for Li ion batteries", Journal of Power Sources, 2013, vol. 239, pp. 269-276.
He et al. "Gassing in Li4Ti5O12-based batteries and its remedy", Scientific Reports, Dec. 3, 2012, vol. 2, No. 913, pp. 1-9.
Scharner et al. "Evidence of Two-Phase Formation upon Lithium Insertion into the Li1.33Ti1.67O4 Spinel", Journal of the Electrochemical Society, 1999, vol. 146, No. 3, pp. 857-861.
Doughty et al. "A General Discussion of Li Ion Battery Safety", The Electrochemical Society Interface, 2012, pp. 37-44.
E. McRae and J.F. Mareche " Stage dependence of the electrical resistivity of graphite intercalation compounds" Journal of Physics C: Solid State Physics, vol. 18, No. 8 , Apr. 5, 1983, pp. 1627-1640, Lab. de Chimie du Solide Miner., Nancy Univ., Vandoeuvre, France.
Takatoshi Kasukabe et al. "Beads-Milling of Waste Si Sawdust into High-Performance Nanoflakes for Lithium-Ion Batteries" Sci Rep. 2017; 7: 42734. Published online Feb. 20, 2017.
Yongxin an et al. "Effects of VC-LiBOB binary additives on SEI formation in ionic liquid-organic composite electrolyte" RSC Advances, 2012, 2, Received Nov. 6, 2011, Accepted Feb. 21, 2012, pp. 4097-4102.
Aaron M. Chockla "Tin-Seeded Silicon Nanowires for High Capacity Li-Ion Batteries" Department of Chemical Engineering, Texas Materials Institute, Center for Nano- and Molecular Science and Technology,The University of Texas at Austin, Austin, Texas 78712-1062, United States, pp. 3738-3745, Published: Sep. 11, 2012.
Yong-Mao Lin et al."High performance silicon nanoparticle anode in fluoroethylene carbonate-based electrolyte for Li-ion batteriesw" Chem. Commun., 2012, 48, Received Mar. 7, 2012, Accepted May 28, 2012, pp. 7268-7270.
Rosa Martel Danoary Tsirinomeny "Contribution to the Ultra-Fast Charging of Electric Vehicles: The Configurable Modular Multi-level Converter (CMMC)" Mots-clés de l'auteur: Ultra-fast; lithium-titanate; UFCEV; CMMC; Flex-EV. Mar. 4, 2016.
Xu et al. "Reversible Conversion of Conducting Polymer Films from Superhydrophobic to Superhydrophilic", Angewandte Chemie, 2005, vol. 44, pp. 6009-6012.
Lewandowski et al. "Ionic liquids as electrolytes for Li-ion batteries—An overview of electrochemical studies", Journal of Power Sources, vol. 194, 2009, pp. 601-609.
Millipore (MSDS 1-Butyl-1-methylpyrrolidinium bis(trifluoromethylsulfonyl)imide high purity {http://www.emdmillipore.com/Web-US-Site/en_CA/-/USD/ProcessMSDS-Start?PlainSKU=MDA_CHEM-492046&Origin=PDF) date Nov. 4, 2014).
Moreno et al. "Ionic Liquid Electrolytes for Safer Lithium Batteries", Journal of the Electrochemical Society, vol. 164, No. 1, 2017, pp. A6026-A6031.
Vlad et al., "Hybrid supercapacitor-battery materials for fast electrochemical charge storage", Scientific Reports 4, Article No. 4315, Mar. 7, 2014.
Office action for U.S. Appl. No. 14/574,409, dated Mar. 12, 2015.
Office action for U.S. Appl. No. 14/574,409, dated Oct. 2, 2015.
Office action for U.S. Appl. No. 14/574,409, dated Jan. 9, 2017.
Office action for U.S. Appl. No. 16/265,470, dated Apr. 15, 2020.

\* cited by examiner

PRIOR ART

PRIOR ART

SYSTEMS AND METHODS FOR ADAPTIVE FAST-CHARGING FOR MOBILE DEVICES AND DEVICES HAVING SPORADIC POWER-SOURCE CONNECTION

CROSS-REFERENCE TO RELATED APPLICATIONS

This patent application is a continuation-in-part application of co-pending U.S. patent application Ser. No. 15/287,292 filed on Oct. 6, 2016 which claims priority to and benefit of U.S. Provisional Patent Application No. 62/238,515 filed Oct. 7, 2015. U.S. patent application Ser. No. 15/287,292 is a continuation-in-part of co-pending U.S. patent application Ser. No. 14/675,771, filed on Apr. 1, 2015, which claims priority to and the benefit of, under 35 U.S.C. § 119(e) to U.S. Provisional Patent Application No. 61/976,551 filed Apr. 8, 2014 all of which are incorporated herein by reference in their entireties.

FIELD AND BACKGROUND OF THE INVENTION

The present invention relates to systems and methods for adaptive fast-charging for mobile devices and devices having sporadic power-source connection.

Modern electronic appliances are becoming ubiquitous for personal as well as business use. It cannot be overstated that with the evolution of such devices, mobility has emerged as a key driver in feature enhancement for technological innovation. While the rapid advancement of low power-consumption processors and flash-memory devices have enabled such mobility to reach new levels of real-world productivity, further development is significantly hampered by the rather slow progress made in battery technology. The proliferation of smart phones, tablets, laptops, ultrabooks, and the like (acquiring smaller and smaller form factors) has made this issue even more abundantly apparent as consumers are eager to have longer and longer device usage times between recharge cycles, without adding heft to the weight and footprint of such devices.

Furthermore, electrical and electronic components that don't fall under the mobile rubric are also in need of extended usage solutions. Such components include devices having sporadic power-source connection (e.g., backup emergency sentinels, remotely-stationed telecommunication repeaters, electric vehicle console communicators, as well as off-shore communication, control, and positioning devices).

The demands of such applications vary widely, for example, in voltage or power level, but all are preferably served by lightweight, power-storage devices which can rapidly and consistently provide high energy density over long time spans, and can be quickly recharged to operational energy levels. To date, such extensive mobile energy needs are being met in part by one of two available types of power-storage devices: rechargeable batteries (e.g., lithium-ion intercalation systems) or supercapacitors (e.g., Faradic pseudo-capacitive type, non-Faradic double-layer reaction types, or hybrid types).

To meet the growing demand in portable electronic devices and devices having sporadic power-source connection, energy storage devices with high specific energy, high power density, long cycle life, low cost, and a high margin of safety must be employed.

Typically, consumers of rechargeable devices do not want to wait a long time for devices to charge. For example, for a consumer using a mobile phone on a business trip, it may not be possible for the consumer to wait a half an hour to have enough battery power to make an important phone call.

Currently, the dominant energy storage device remains the battery, particularly the lithium-ion battery. Lithium-ion batteries power nearly every portable electronic device, as well as almost every electric car, including the Tesla Model S and the Chevy Volt. Batteries store energy electrochemically, in which chemical reactions release electrical carriers that can be extracted into an electrical circuit. During discharge, the energy-containing lithium ions travel from a high-energy anode material through a separator to a low-energy cathode material. The movement of the lithium ions releases energy, which is extracted into an external circuit.

During battery charging, energy is used to move the lithium ions back to the high-energy anode compound. The charge and discharge process in batteries is a slow process, and can degrade the chemical compounds inside the battery over time. A key bottleneck in achieving enhanced performance is the limited fast-charging ability of any standard battery. Rapid charging causes accelerated degradation of the battery constituents, as well as a potential fire hazard due to a localized, over-potential build-up and increased heat generation.

For example, Li-ion batteries have the highest energy density of rechargeable batteries available, but typically suffer from low power by virtue of reversible Coulombic reactions occurring at both electrodes, involving charge transfer and ion diffusion in bulk electrode materials. Since both diffusion and charge transfer are slow processes, power delivery as well as the recharge time of Li-ion batteries is kinetically limited. As a result, batteries have a low power density, and lose their ability to retain energy throughout their lifetime due to material degradation.

On the other extreme, electrochemical double-layer capacitors (EDLCs) or ultracapacitors are, together with pseudocapacitors, part of a new type of electrochemical capacitors called supercapacitors (hereinafter referred to as SCs), which store energy through accumulation of ions on an electrode surface, have limited energy storage capacity, but very high power density. In such SCs, energy is stored electrostatically on the surface of the material, and does not involve a chemical reaction. As a result, SCs can be charged quickly, leading to a very high power density, and do not lose their storage capabilities over time. SCs can last for millions of charge/discharge cycles without losing energy storage capability. The main shortcoming of SCs is their low energy density, meaning that the amount of energy SCs can store per unit weight is very small, particularly when compared to batteries.

The most intuitive approach to combine high energy and high power density within a single device is to combine different types of energy storage sources. So far, such hybrid power-source devices involving SCs and batteries have mainly been explored in view of parallel connection (i.e., an SC is being used as a power supply, while the battery is used as an energy source, which supplies energy both to the load and to the SC, which in turn, should be charged at all times). The contribution of components to the total stored charge is not optimal, due to the minimal use of the SC, and the higher degradation of the battery due to the additional charging of the SC.

In the prior art, Kan et al. published findings (*Journal of Power Sources*, 162(2), 971-974, 2006) analyzing combinations of rechargeable batteries and capacitors in storage media of photovoltaic-powered products. In such applications, the focus of the study was to reduce power cycling of the batteries by utilizing a well-defined recharge duty cycle.

Buiel et al. published findings at the Capacitor and Resistor Technology Symposium (*CARTS International* 2013) on development of ultrathin ultracapacitors for enhanced lithium batteries in portable electronic applications. The focus of the study was to extend the usable energy stored on lithium batteries by compensating for voltage droop during GSM radio pulses by employing an SC to discharge to the lithium battery when the low-voltage cutoff of the main battery is reached. Similarly, this was also partly the subject of International Patent Publication No. WO/2006/112698 for a rechargeable power supply.

It would be desirable to have systems and methods for adaptive fast-charging for mobile devices and devices having sporadic power-source connection. It is also desirable to reduce the cost of fast charging batteries. Such systems and methods would, inter alia, overcome the various limitations mentioned above.

SUMMARY

It is the purpose of the present invention to provide systems and methods for adaptive fast-charging for mobile devices and devices having sporadic power-source connection.

It is noted that the term "exemplary" is used herein to refer to examples of embodiments and/or implementations, and is not meant to necessarily convey a more-desirable use-case. Similarly, the terms "preferred" and "preferably" are used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

Preferred embodiments of the present invention enable adaptive fast-charging of mobile devices and devices having sporadic power-source connection by incorporating high-energy SCs in combination with rechargeable batteries, allowing for higher system power, while preserving the energy density of the battery in a device-compatible form factor.

Features of such adaptive fast-charging systems and methods include, inter alia the following aspects.

Fast charging (e.g., due to SC and/or fast charging battery cell properties)

Adaptive charging intervals (e.g., via control of battery charging characteristics)

Standard working time (e.g., using 1500 mAh for both fast charge and rechargeable battery, talk time supplied is about 20 hours)

High energy density (e.g., due to intrinsic battery and/or the fast charging battery cell properties, having an exemplary density range of 450 Wh/l to 700 Wh/l)

High power density (due to intrinsic SC properties and/or due to intrinsic Flashbattery properties, having an exemplary power density range of 5400 W/l to 7200 W/l)

Battery lifetime improvement (via control of battery charging characteristics for example, from 500 cycles for standard mobile device battery to more than 1500 cycles)

High current input allowed (e.g., from 10 A to 25 A) The system, that includes the connector, power management control done by the controller, metal conductive wires, electronic components for delivering current, can allow for the option of delivering high current to the fast charging battery.

Adaptive battery charging by controlling the current (e.g., control of the current into the rechargeable battery, cycle life of the rechargeable battery can be improved. In general, standard rechargeable battery's cycle life gets higher as charging current is lower)

Substantially, no overheating due to high charging current (e.g., due to very low internal resistance of fast charging battery cell properties, and/or battery charging is controlled, e.g., from 1-10 mOhm for internal resistance)

Can't be overcharged (SC can't be overcharged, and battery charging is controlled)

Can't be overheated (SC can't be overheated, and battery charging is controlled)

Low self-discharge (e.g., energy is accumulated in battery, with low intrinsic discharge properties and/or fast charging battery cell properties can have the same self-discharge characteristic as standard Li ion battery, the low self-discharge in the exemplary range of 5% in 24 h, then 1-2% per month).

Therefore, according to the present invention, there is provided a method for adaptive fast-charging for mobile devices and devices having sporadic power-source connection, the method including the steps of: (a) firstly determining whether a supercapacitor of a device is charged; (b) upon detecting the supercapacitor is charged, secondly determining whether a battery of the device is charged; and (c) upon detecting the battery is not charged, firstly charging the battery from the supercapacitor.

Preferably, the step of firstly determining includes determining whether the supercapacitor is partially charged, and the step of secondly determining includes determining whether the battery is partially charged.

Preferably, the step of firstly charging is adaptively regulated to perform at least one task selected from the group consisting of: preserving a lifetime of the battery by controlling a current to the battery, and discharging the supercapacitor in order to charge the battery.

Most preferably, the discharging enables the supercapacitor to be subsequently recharged.

Preferably, the method further including the steps of: (d) prior to the step of firstly determining, initially determining whether an external charger is connected to the device; and (e) upon detecting the external charger is connected to the device, secondly charging the supercapacitor and/or the battery from the external charger.

Most preferably, the method further including the step of: (f) upon detecting the external charger is not connected to the device, supplying energy to the device from the supercapacitor and/or the battery.

According to the present invention, there is provided a system for adaptive fast-charging for mobile devices and devices having sporadic power-source connection, the system including: (a) a supercapacitor charging controller for firstly determining whether a supercapacitor of a device is charged; and (b) a battery charging controller for secondly determining whether a battery of the device is charged; wherein, upon detecting the supercapacitor is charged and upon detecting the battery is not charged, the supercapacitor charging controller is configured for firstly charging the battery from the supercapacitor.

Preferably, the firstly determining includes determining whether the supercapacitor is partially charged, and the secondly determining includes determining whether the battery is partially charged.

Preferably, the firstly charging is adaptively regulated to perform at least one task selected from the group consisting of: preserving a lifetime of the battery by controlling a current to the battery, and discharging the supercapacitor in order to charge the battery.

Most preferably, the discharging enables the supercapacitor to be subsequently recharged.

Preferably, the supercapacitor charging controller is further configured for: (i) prior to the firstly determining, initially determining whether an external charger is connected to the device; and (ii) upon detecting the external charger is connected to the device, secondly charging the supercapacitor and/or the battery from the external charger.

Most preferably, the supercapacitor charging controller is further configured for: (iii) upon detecting the external charger is not connected to the device, supplying energy to the device from the supercapacitor and/or the battery.

According to the present invention, there is provided a non-transitory computer-readable medium, having computer-readable code embodied on the non-transitory computer-readable medium, the computer-readable code having program code for adaptive fast-charging for mobile devices and devices having sporadic power-source connection, the computer-readable code including: (a) program code for firstly determining whether a supercapacitor of a device is charged; (b) program code for, upon detecting the supercapacitor is charged, secondly determining whether a battery of the device is charged; and (c) program code for, upon detecting the battery is not charged, firstly charging the battery from the supercapacitor.

Preferably, the firstly determining includes determining whether the supercapacitor is partially charged, and the secondly determining includes determining whether the battery is partially charged.

Preferably, the firstly charging is adaptively regulated to perform at least one task selected from the group consisting of: preserving a lifetime of the battery by controlling a current to the battery, and discharging the supercapacitor in order to charge the battery.

Most preferably, the discharging enables the supercapacitor to be subsequently recharged.

Preferably, the computer-readable code comprising further includes: (d) program code for, prior to the firstly determining, initially determining whether an external charger is connected to the device; and (e) program code for, upon detecting the external charger is connected to the device, secondly charging the supercapacitor and/or the battery from the external charger.

Most preferably, the computer-readable code comprising further includes: (f) program code for, upon detecting the external charger is not connected to the device, supplying energy to the device from the supercapacitor and/or the battery.

These and further embodiments will be apparent from the detailed description that follows.

BRIEF DESCRIPTION OF THE DRAWINGS

The present invention is herein described, by way of example only, with reference to the accompanying drawing, wherein.

DESCRIPTION OF THE PREFERRED EMBODIMENTS

The present invention relates to systems and methods for adaptive fast-charging for mobile devices and devices having sporadic power-source connection. The principles and operation for providing such systems and methods, according to the present invention, may be better understood with reference to the accompanying description and the drawings.

Figure 1:
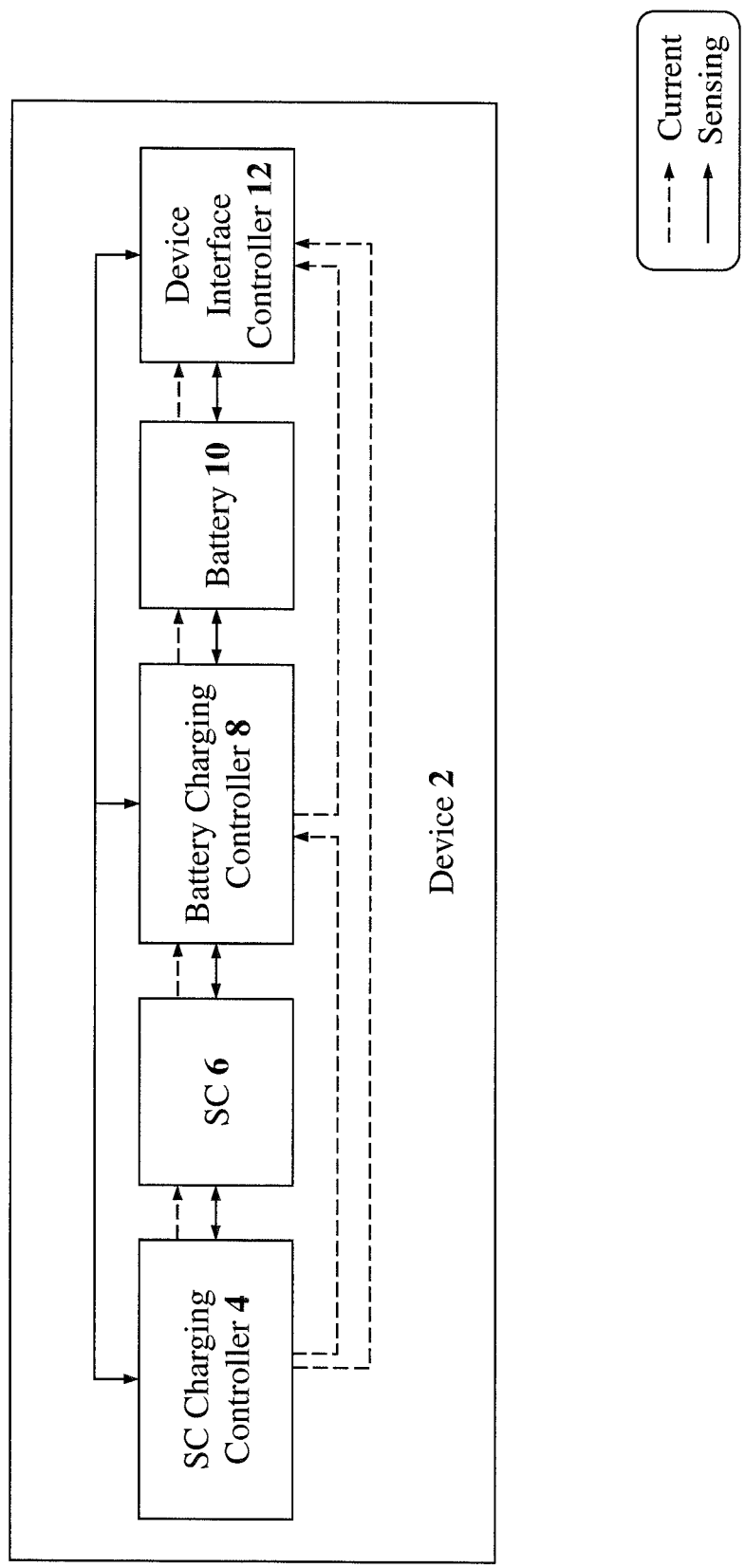
FIG. 1 is a simplified high-level schematic diagram of the device architecture for adaptive fast-charging for mobile devices and devices having sporadic power-source connection, according to preferred embodiments of the present invention.

Referring to the drawings, FIG. 1 is a simplified high-level schematic diagram of the device architecture for adaptive fast-charging for mobile devices and devices having sporadic power-source connection, according to preferred embodiments of the present invention. A device 2 (i.e., mobile device or a device having sporadic power-source connection) is shown having a SC charging controller 4, an SC 6, a battery charging controller 8, a rechargeable battery 10, and a device interface controller 12 operationally connected to each other. SC charging controller 4 and battery charging controller 8 each include a charge-sensing element (not shown in FIG. 1) for detecting the level of charge on SC 6 and battery 10, respectively. Charging current flow and charge sensing among the various components are depicted by arrows in FIG. 1.

SC charging controller 4 is responsible for charging preferences of SC 6 and/or battery 10. SC 6 allows for fast charging for operation of device 2, and is responsible for power and energy accumulation. Battery charging controller 8 is responsible for battery charging preferences and current input from SC 6 and/or from SC charging controller 4. Battery 10 is responsible for energy and power accumulation. Device interface controller 12 is responsible for energy and power input preferences for device 2 (e.g., laptop, electric car, and cell-phone).

The device architecture of FIG. 1 enables an optimal contribution of SC 6 and battery 10 to performance of device 2. Such device architecture provides a dramatic improvement of battery power capabilities by decoupling power and energy performance, thus increasing the cycle life of the battery. Fast-charging capability is achieved largely by the high power capacity of SC 6, which can be charged using high current flowing from an external charger (not shown in FIG. 1). After charging of SC 6 is complete, the external charger may be disconnected. Then, battery 10 is charged via the charging current from SC 6. The charge/discharge current flow between SC 6 and battery 10 may be modified according to the indication of SC charging controller 4, battery charging controller 8, and device interface controller 12, thus giving rise to a higher cycle life of device 2.

SC 6 includes an electrolyte and electrodes. The electrodes may be made from activated carbon powders, carbon nanotubes, carbon nanofibres, carbon aerogels, metal oxides, conductive polymers (such as poly aniline, polypyrrole, polythiophene). In addition, several SCs may be connected in series or/and parallel to form a composite component represented as SC 6.

SC charging controller 4 allows high DC current or pulse current inputs, and enables customized charging preferences (e.g., slow and fast discharge options) between SC 6 and battery 10 when an external charger is connected, while monitoring the accumulated charge on each of SC 6 and battery 10.

Figure 2:
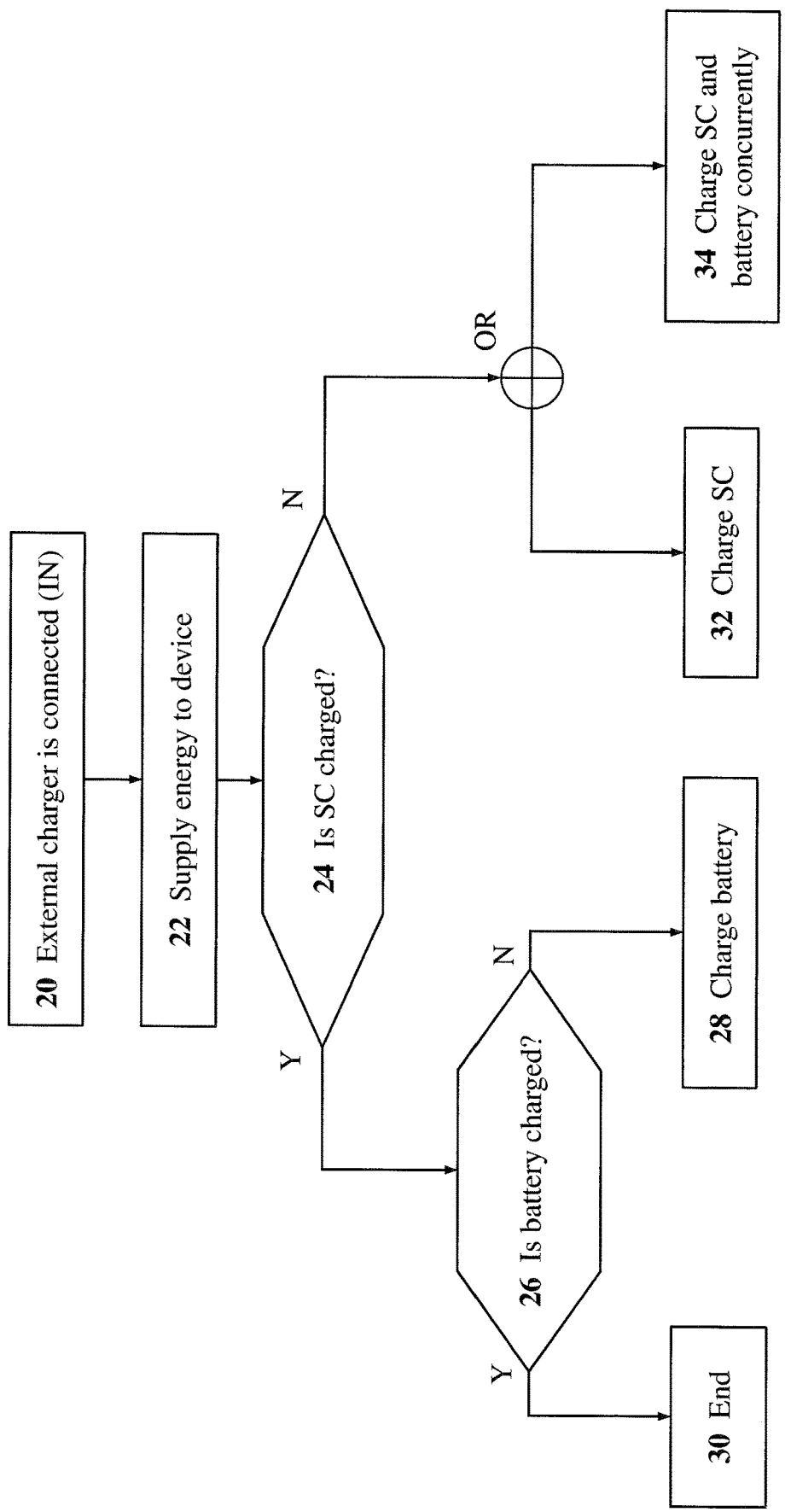
FIG. 2 is a simplified flowchart of the major process steps of an SC controller for adaptive fast-charging for mobile devices and devices having sporadic power-source connection, according to preferred embodiments of the present invention.

FIG. 2 is a simplified flowchart of the major process steps of an SC controller for adaptive fast-charging for mobile devices and devices having sporadic power-source connection, according to preferred embodiments of the present invention. When an external charger is connected to a power source (IN) (Step 20), energy is supplied from the external charger to device 2 without using the stored energy in SC 6 and/or battery 10 (Step 22). The energy and power needed for device 2 is drawn from the charger itself, but can be also be supplied from SC 6 and/or battery 10.

The charge-sensing element of SC charge controller 4 then determines whether SC 6 is fully charged (Step 24). SC 6 and/or battery 10 receive their charging current from the external charger. The charging current may be continuous current or pulsed. If SC 6 is fully charged, the charge-sensing element of battery charge controller 8 then determines whether battery 10 is fully charged (Step 26). If battery 10 is not fully charged, energy is supplied from the external charger via charging current to battery 10 (Step 28). If battery 10 is fully charged, energy is not supplied from the external charger to battery 10, and the process ends (Step 30). The external charger may only supply the needed energy and power to device 2.

If SC 6 is not fully charged in Step 24, then energy is supplied from the external charger via charging current to SC 6 (Step 32), or supplied concurrently to both SC 6 and battery 10 (Step 34).

Battery charging controller 8 allows adjustable current and/or voltage output, and enables customized charging preferences (e.g., slow and fast discharge options) of battery 10 when the external charger is not connected to a power source (OUT), while monitoring the accumulated charge on each of SC 6 and battery 10. Battery charging controller 8 also serves as an input current/voltage controller via, for example, DC-DC converters (e.g., step-up or step-down transformers).

Figure 3:
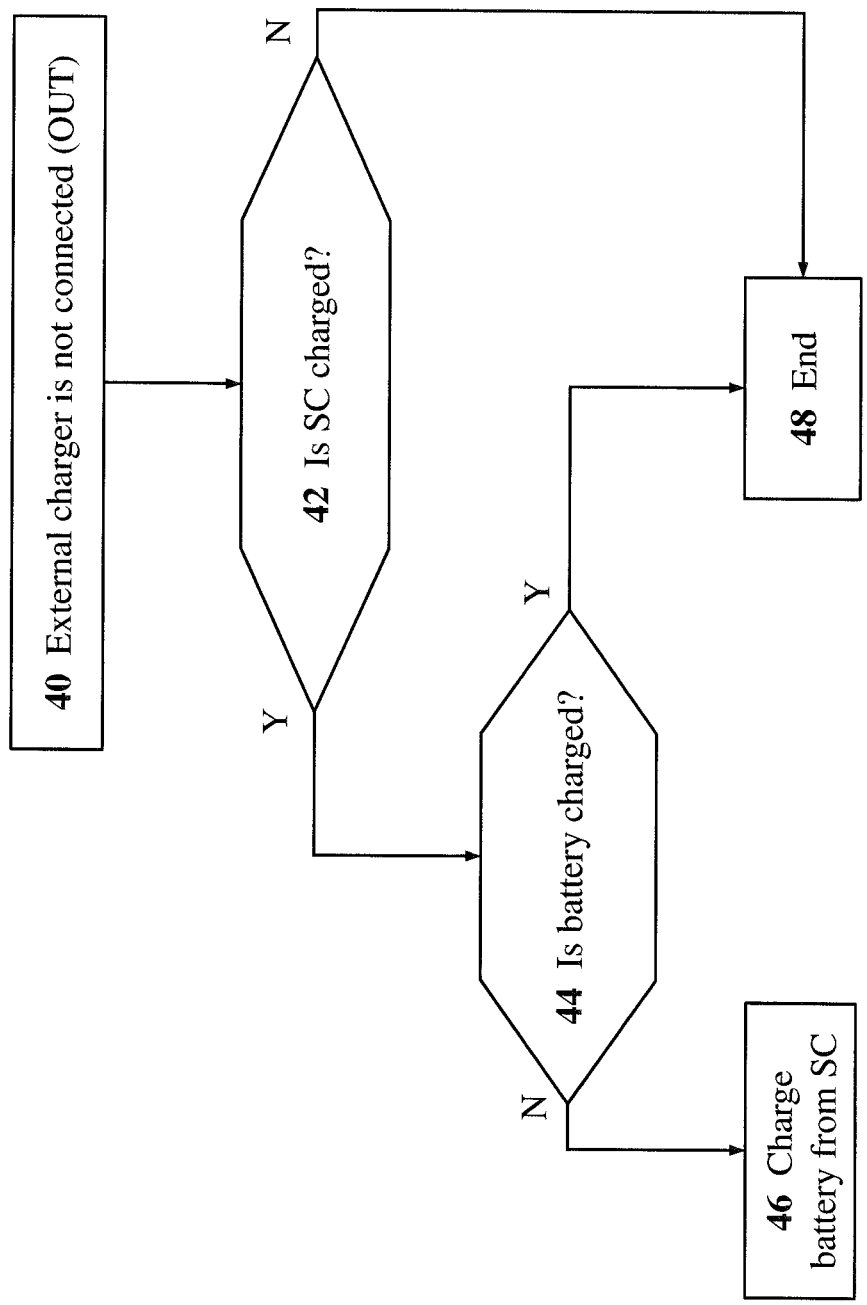
FIG. 3 is a simplified flowchart of the major process steps of a battery controller for adaptive fast-charging for mobile devices and devices having sporadic power-source connection, according to preferred embodiments of the present invention.

FIG. 3 is a simplified flowchart of the major process steps of a battery controller for adaptive fast-charging for mobile devices and devices having sporadic power-source connection, according to preferred embodiments of the present invention. When an external charger is not connected to a power source (OUT) (Step 40), the charge-sensing element of SC charge controller 4 determines whether SC 6 is fully charged (Step 42). If SC 6 is even partially charged, the charge-sensing element of battery charge controller 8 then determines whether battery 10 is fully charged (Step 44). If battery 10 is not fully charged, battery 8 is charged via charging current from SC 6 (Step 46). If battery 10 is fully charged, or if SC is not charged at all, then the process ends (Step 48).

Device interface controller 12 is responsible for managing and prioritizing the energy and power demands of the load of device 2 with regard to the energy and power supplies via current/voltage regulation.

Figure 4:
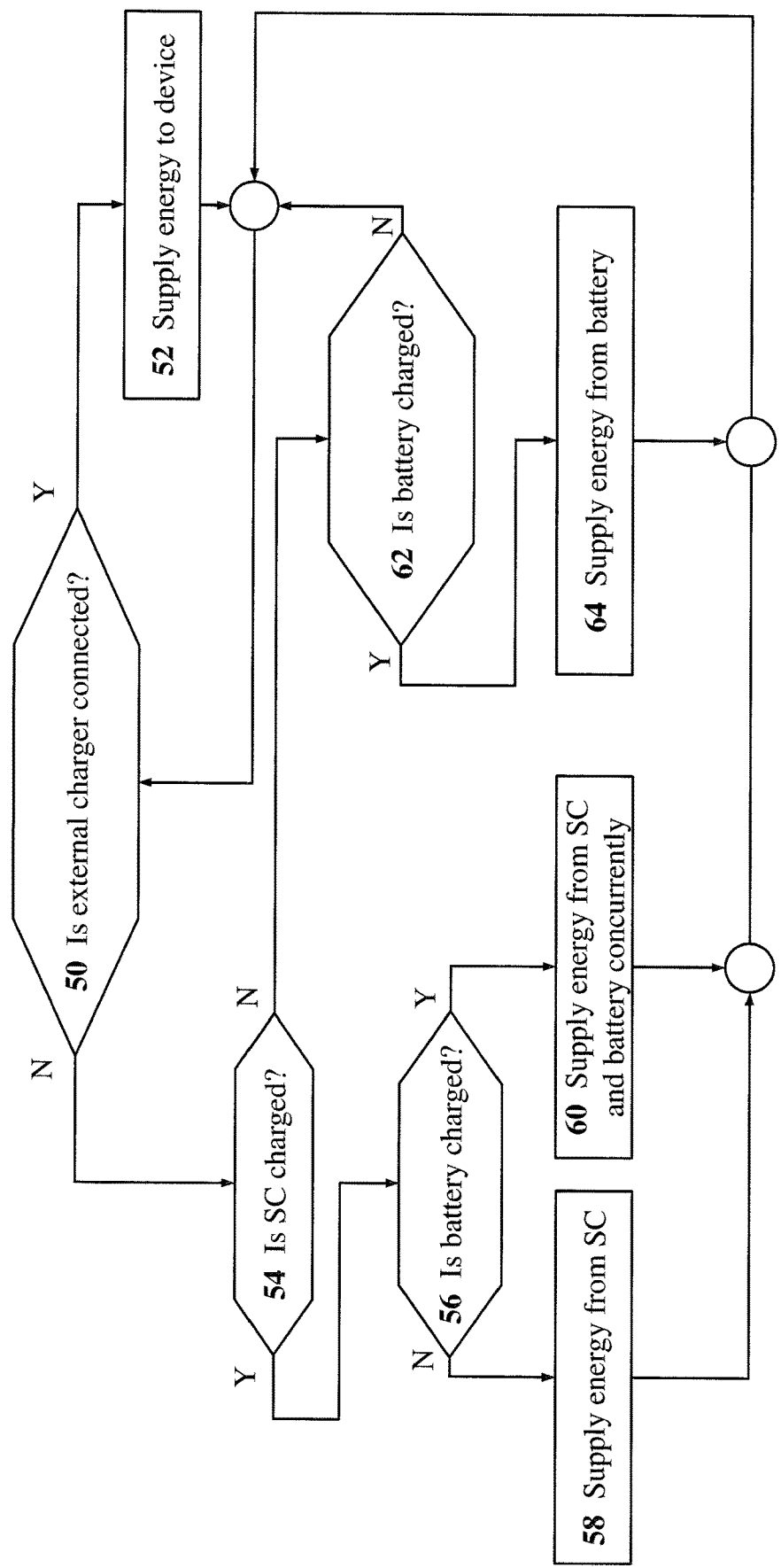
FIG. 4 is a simplified flowchart of the major process steps of a device interface controller for adaptive fast-charging for mobile devices and devices having sporadic power-source connection, according to preferred embodiments of the present invention.

FIG. 4 is a simplified flowchart of the major process steps of a device interface controller for adaptive fast-charging for mobile devices and devices having sporadic power-source connection, according to preferred embodiments of the present invention. Device interface controller 12 determines whether an external charger is connected (Step 50). If an external charger is connected to a power source (IN), then energy and power is supplied from the external charger to device 2 for operation and/or for charging SC 6 and/or battery 10 if they are not fully charged (Step 52), and the process returns to Step 50.

If an external charger is not connected to a power source (OUT), then the charge-sensing element of SC charge controller 4 determines whether SC 6 is even partially charged (Step 54). If SC 6 is even partially charged, then the charge-sensing element of battery charge controller 8 determines whether battery 10 is even partially charged (Step 56). If battery 10 is not charged at all, then power is supplied solely from SC 6 via charging current to device 2 (Step 58), and the process returns to Step 50. If battery 10 is even partially charged in Step 56, then energy and power is supplied concurrently from both SC 6 and battery 10 to device 2 (Step 60), and the process returns to Step 50.

If SC 6 is not charged at all in Step 54, then the charge-sensing element of battery charge controller 8 determines whether battery 10 is even partially charged (Step 62). If battery 10 is even partially charged, then energy and power is supplied solely from battery 10 (Step 64), and the process returns to Step 50. If battery 10 is not charged at all, then the process returns to Step 50.

Simulations

Figure 5B:
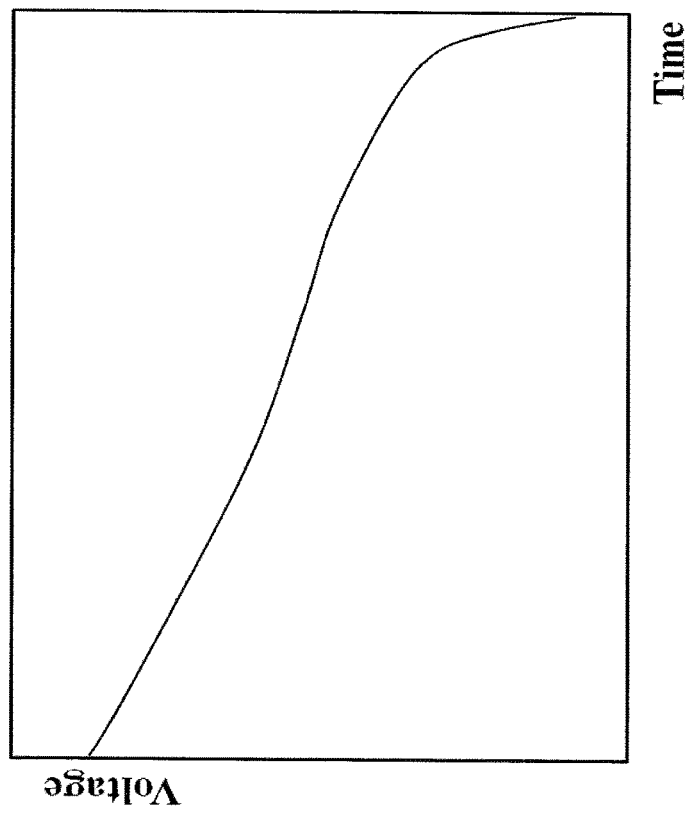
FIG. 5B is a graph of a typical Li-ion battery discharge curve, as known in the prior art.
Figure 5A:
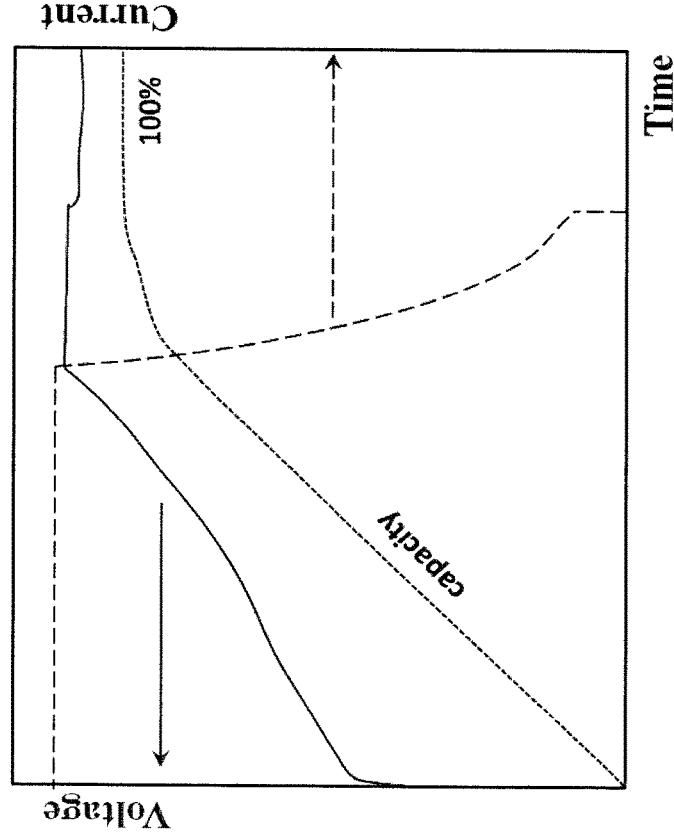
FIG. 5A is a graph of a typical Li-ion battery charge curve, as known in the prior art.
Figure 6B:
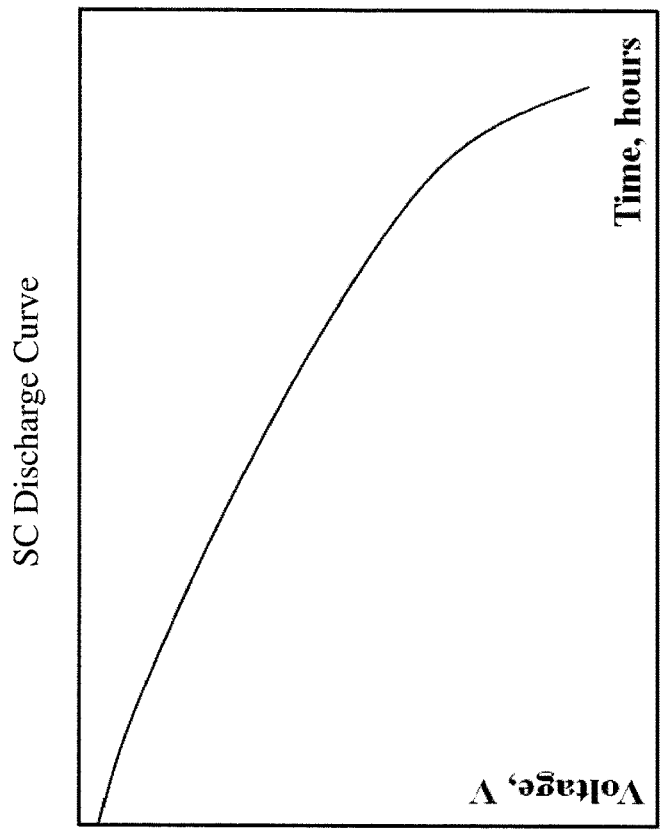
FIG. 6B is a graph of a typical SC discharge curve, as known in the prior art.
Figure 6A:
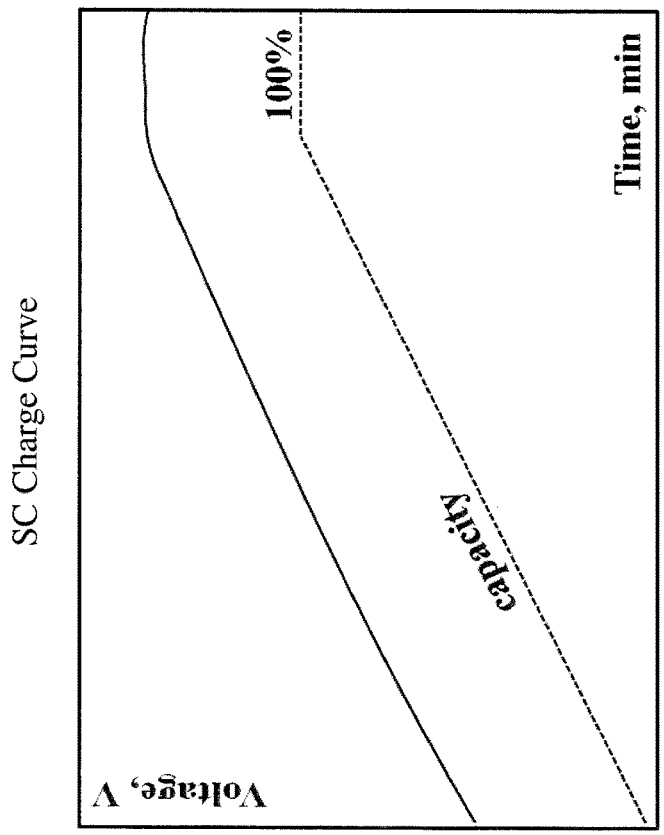
FIG. 6A is a graph of a typical SC charge curve, as known in the prior art.

As a reference, FIG. 5A is a graph of a typical Li-ion battery charge curve, and FIG. 5B is a graph of a typical Li-ion battery discharge curve, as known in the prior art. FIG. 6A is a graph of a typical SC charge curve, and FIG. 6B is a graph of a typical SC discharge curve, as known in the prior art.

Unlike batteries, SCs may be charged and discharged at very high current, resulting in fast charge/discharge rates. SCs may be charged by constant current. A DC-to-DC constant current regulator is the simplest form of active charging. Either a buck or boost regulator may be used depending on the application. A buck regulator is the preferred topology due to the continuous output charge current.

The present invention relates to systems and methods for adaptive fast-charging for mobile devices and devices having sporadic power-source connection. Charge/discharge simulations were conducted with a FlashBattery system as follows.

- SC charging controller—output voltage: up to 10V; output current: up to 30 A (e.g., LinearTechnology, LT3741)
- SC—capacitance C=180 F; voltage V=10.8V; energy E=3 Wh; charge time: @30 A, ~60 sec.
- Battery charging controller—input voltage: min 200 mV; output voltage: up to 4.5V; output current: up to 1000 mA; Li-ion rechargeable battery; capacity 1500 mAh; voltage V=3.7V; charge time: @500 mA, ~200 min. or @ 1000 mA, ~100 min. (LinearTechnology, LTC3105)
- Device interface controller—current switch between SC and battery.
- Device—constant load: 200 mA (i.e., average current for 3G mobile service for cellphone with 2100 mAh battery and charge for 11 hrs.)

Using FlashBattery parameters listed above, the following simulation data was obtained: (1) SC fully charged within 60 sec; (2) SC discharged down to 0.5% capacity; and (3) battery fully charged within 100 or 200 minutes using 1000 mA and 500 mA, respectively. Details of the simulation parameters are provided below in the following Tables.

TABLE 1

Charge/discharge simulation parameters of FlashBattery system for 60-sec charge, with battery charged in rapid mode using 1000 mA (Simulation #1).

| Time | SC Charging Controller | Battery Charging Controller | Device Interface Controller | SC/Battery |
|---|---|---|---|---|
| t = 0 | External charger: IN | Battery charging: OFF | Load current from external charger | SC = 0%, Batt = 0% |
| t = 60 sec | External charger: OUT | Battery charging: ON - 1000 mA | Load current from SC: 200 mA | SC = 100%, Batt = 0% |
| t ~36 min | External charger: OUT | Battery charging: OFF | Load current from battery: 200 mA | SC ~0%, Batt ~40% |
| t >36 min | External charger: OUT | Battery charging: OFF | Load current from battery: 200 mA | Batt <40% |

Figure 7:
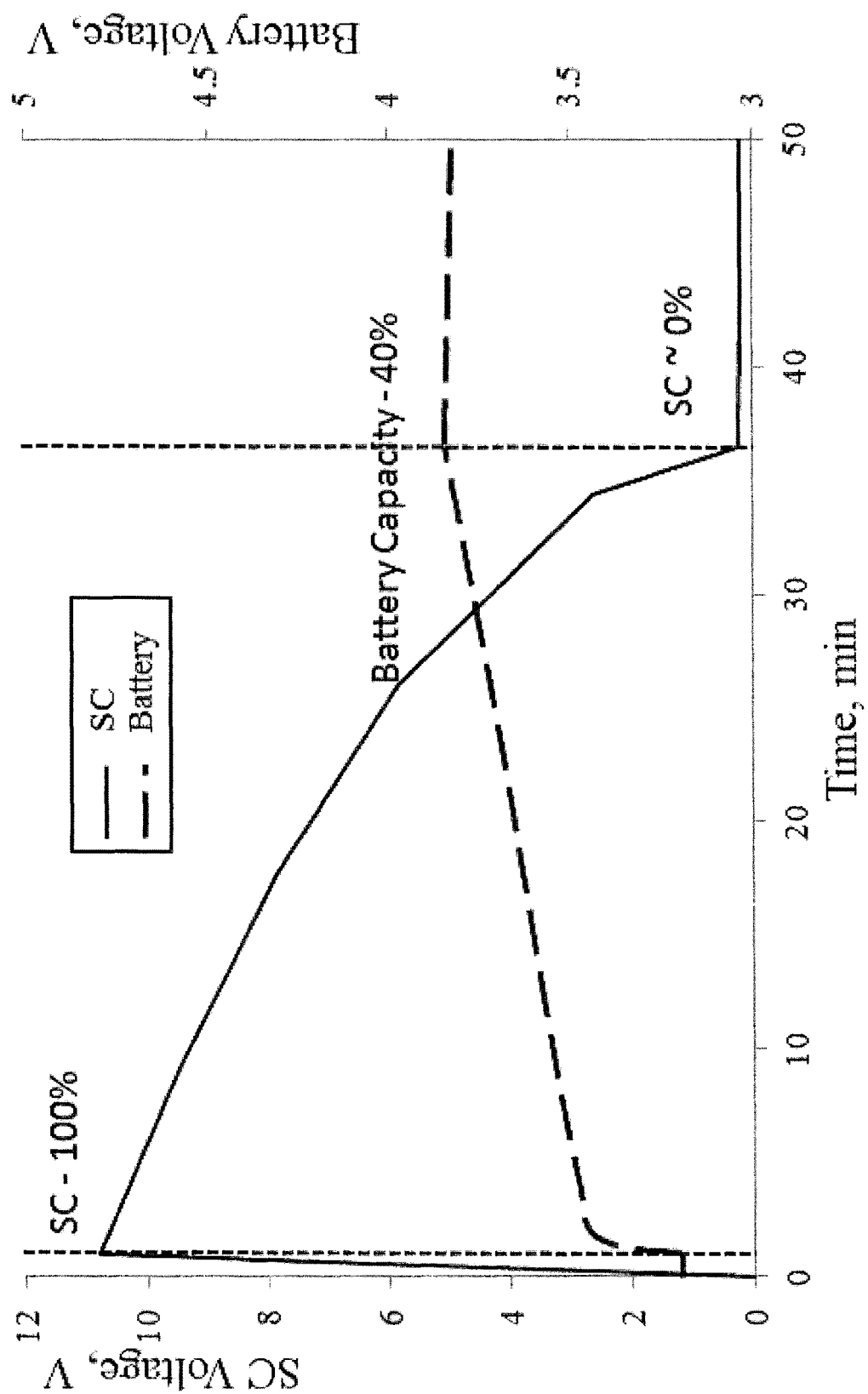
FIG. 7 is a graph of a FlashBattery charge/discharge simulation in accordance with the simulation parameters of Table 1, according to preferred embodiments of the present invention.

FIG. 7 is a graph of a FlashBattery charge/discharge simulation in accordance with the simulation parameters of Table 1, according to preferred embodiments of the present invention.

TABLE 2

Charge/discharge simulation parameters of FlashBattery system, 100% charged for both SC and battery, with battery charged in rapid mode using 1000 mA (Simulation #2).

| Time | SC Charging Controller | Battery Charging Controller | Device Interface Controller | SC/Battery |
|---|---|---|---|---|
| t = 0 | External charger: IN | Battery charging: OFF | Load current from external charger | SC = 0%, Bat = 0% |
| t = 60 sec | External charger: OUT | Battery charging: ON - 1000 mA | Load current from SC - 200 mA | SC = 100%, Bat = 0% |
| t ~36 min | External charger: OUT | Battery charging: OFF | Load current from battery - 200 mA | SC ~0%, Batt ~40% |
| t ~60 min | External charger: IN | Battery charging: OFF | Load current from external charger | SC ~0%, Batt ~35% |
| t ~61 min | External Charger "OUT" | Battery charging: ON - 1000 mA | Load current from SC - 200 mA | SC = 100% Batt ~35% |
| t ~97 min | External charger: OUT | Battery charging: OFF | Load current from Battery - 200 mA | SC ~0% Batt ~75% |
| t ~120 min | External charger: IN | Battery charging: OFF | Load current from external charger | SC ~0% Batt ~70% |
| t ~121 min | External charger: OUT | Battery charging: ON - 1000 mA | Load current from SC - 200 mA | SC = 100% Batt ~70% |
| t ~125 min | External charger "OUT" | Battery Charging: ON - constant voltage mode (<1000 mA) | Load current from SC - 200 mA | SC ~80% Batt ~80% |
| t ~152 min | External charger: OUT | Battery Charging: OFF | Load current from SC - 200 mA | SC ~60% Batt = 100% |

TABLE 2-continued

Charge/discharge simulation parameters of FlashBattery system, 100% charged for both SC and battery, with battery charged in rapid mode using 1000 mA (Simulation #2).

| Time | SC Charging Controller | Battery Charging Controller | Device Interface Controller | SC/Battery |
|---|---|---|---|---|
| t ~153 min | External charger: IN | Battery Charging: OFF | Load current from external charger | SC ~60% Batt = 100% |
| t ~153 min | External charger: OUT | Battery charging: OFF | Load current from SC - 200 mA | SC = 100% Batt = 100% |
| t >153 min | External charger: OUT | Battery charging: OFF | Load current from SC - 200 mA | SC <100% Batt = 100% |

Figure 8:
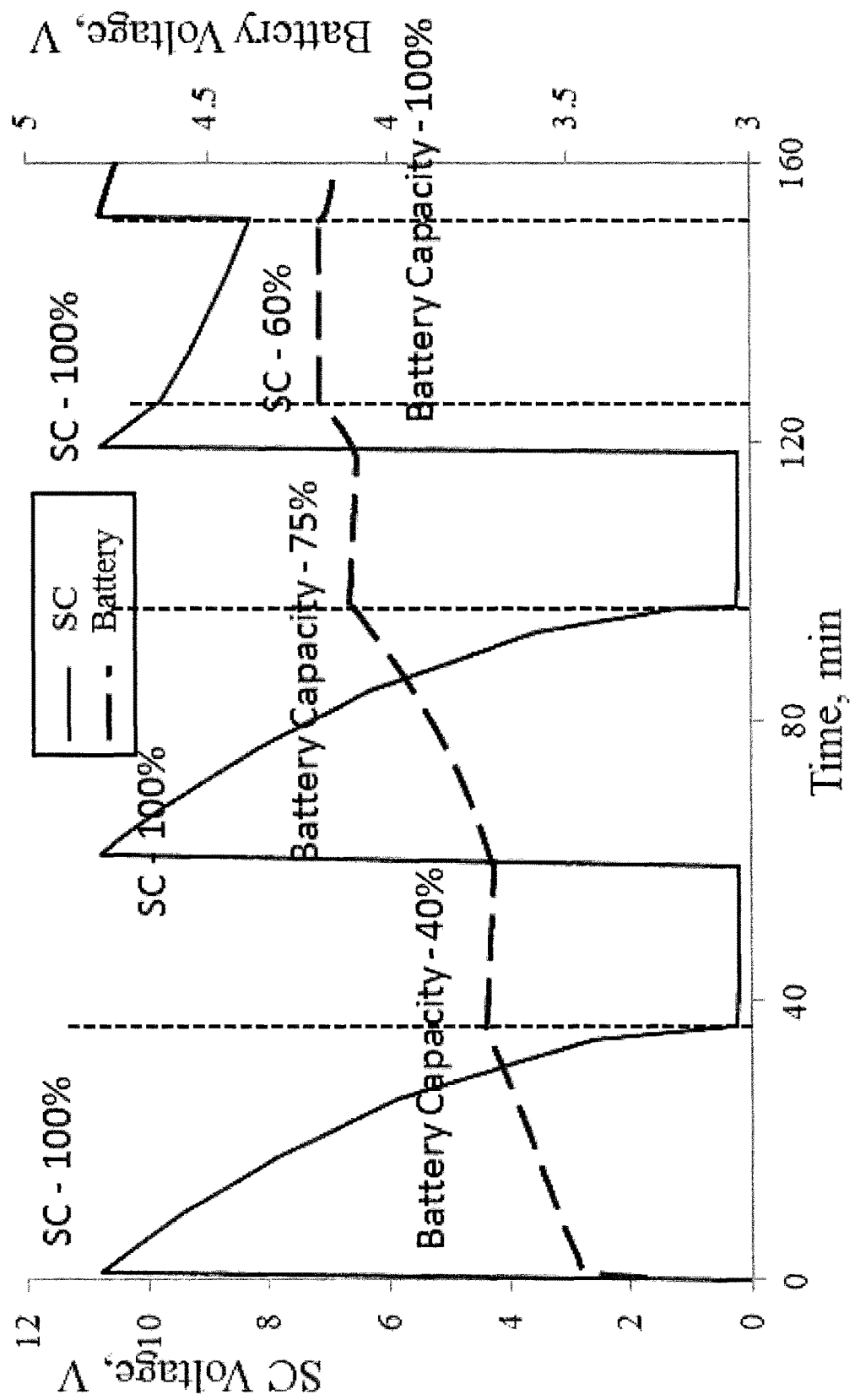
FIG. 8 is a graph of a FlashBattery charge/discharge simulation in accordance with the simulation parameters of Table 2, according to preferred embodiments of the present invention.

FIG. 8 is a graph of a FlashBattery charge/discharge simulation in accordance with the simulation parameters of Table 2, according to preferred embodiments of the present invention.

TABLE 3

Charge/discharge simulation parameters of FlashBattery system for 60-sec. charge, operation on battery, with battery charged in rapid mode using 1000 mA (Simulation #3).

| Time | SC Charging Controller | Battery Charging Controller | Device Interface Controller | SC/Battery |
|---|---|---|---|---|
| t = 0 | External charger: IN | Battery charging: OFF | Load current from external charger | SC = 0%, Batt = 0% |
| t = 60 sec | External charger: OUT | Battery charging: ON - 300 mA | Load current from SC - 200 mA | SC = 100%, Batt = 0% |
| t ~36 min | External charger: OUT | Battery charging: OFF | Load current from battery - 200 mA | SC ~o% Batt ~40% |
| t ~216 min | External charger: IN | Battery charging: OFF | Load current from external charger | SC ~o% Batt = 0% |
| t ~217 min | External charger: OUT | Battery charging: ON - 300 mA | Load Current from SC - 200 mA | SC = 100%, Batt = 0% |
| t ~253 min | External charger: OUT | Battery charging: OFF | Load current from battery - 200 mA | SC ~o% Batt ~40% |
| t >253 min | External charger: OUT | Battery charging: OFF | Load current from battery - 200 mA | SC ~o% Batt <40% |

Figure 9:
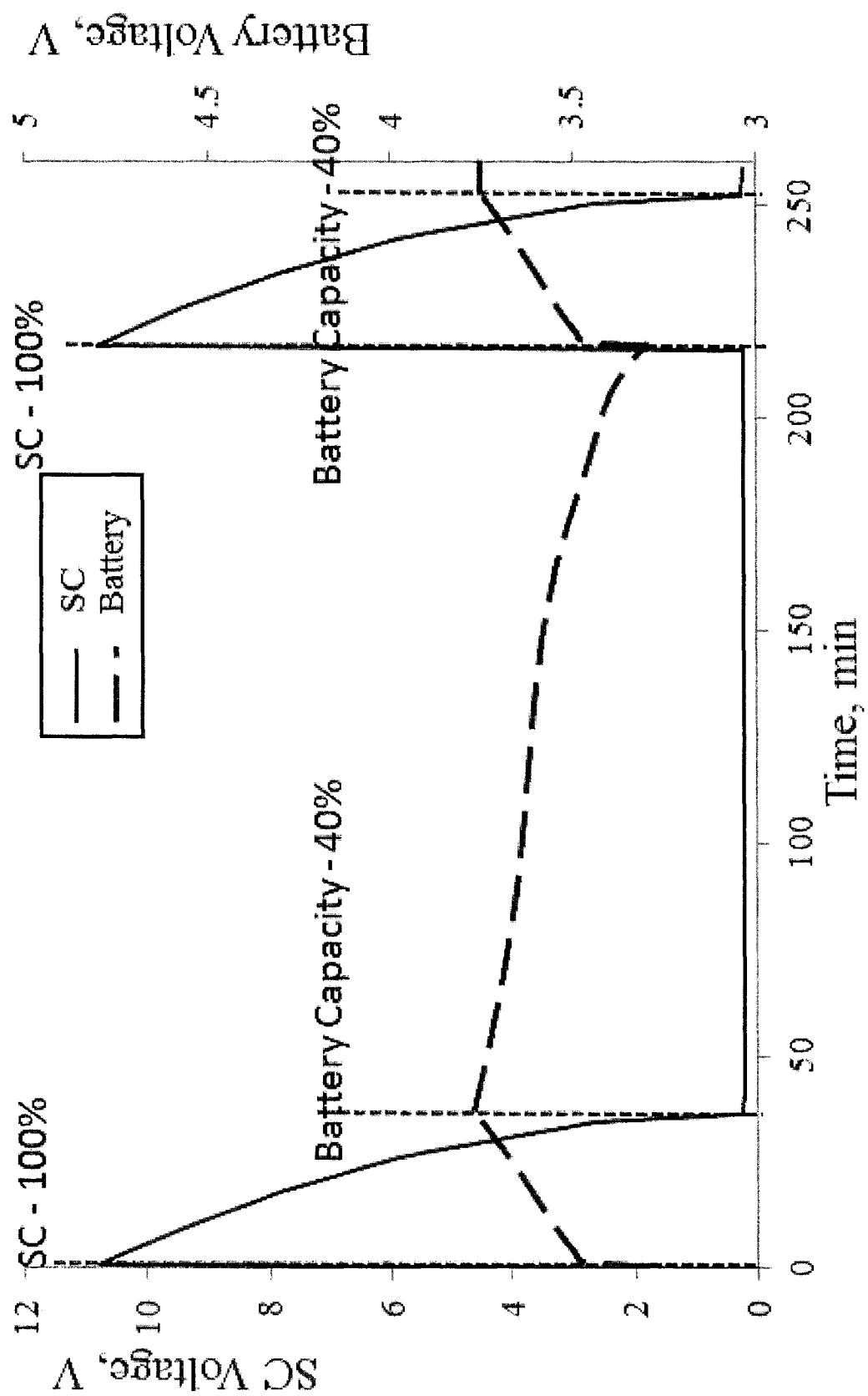
FIG. 9 is a graph of a FlashBattery charge/discharge simulation in accordance with the simulation parameters of Table 3, according to preferred embodiments of the present invention.

FIG. 9 is a graph of a FlashBattery charge/discharge simulation in accordance with the simulation parameters of Table 3, according to preferred embodiments of the present invention.

TABLE 4

Charge/discharge simulation parameters of FlashBattery system for low-current battery charge from SC, with battery charged in low-current mode using 500 mA (Simulation #4).

| Time | SC Charging Controller | Battery Charging Controller | Device Interface Controller | SC/Battery |
|---|---|---|---|---|
| t = 0 | External charger: IN | Battery charging: OFF | Load current from external charger | SC = 0%, Batt = 0% |
| t = 60 sec | External charger: OUT | Battery charging: ON - 500 mA | Load current from SC - 200 mA | SC = 100%, Batt = 0% |
| t ~60 min | External charger: OUT | Battery charging: OFF | Load current from battery - 200 mA | SC ~o% Batt ~35% |
| t >60 min | External charger: OUT | Battery charging: OFF | Load current from battery - 200 mA | SC ~o% Batt <35% |

Figure 10:
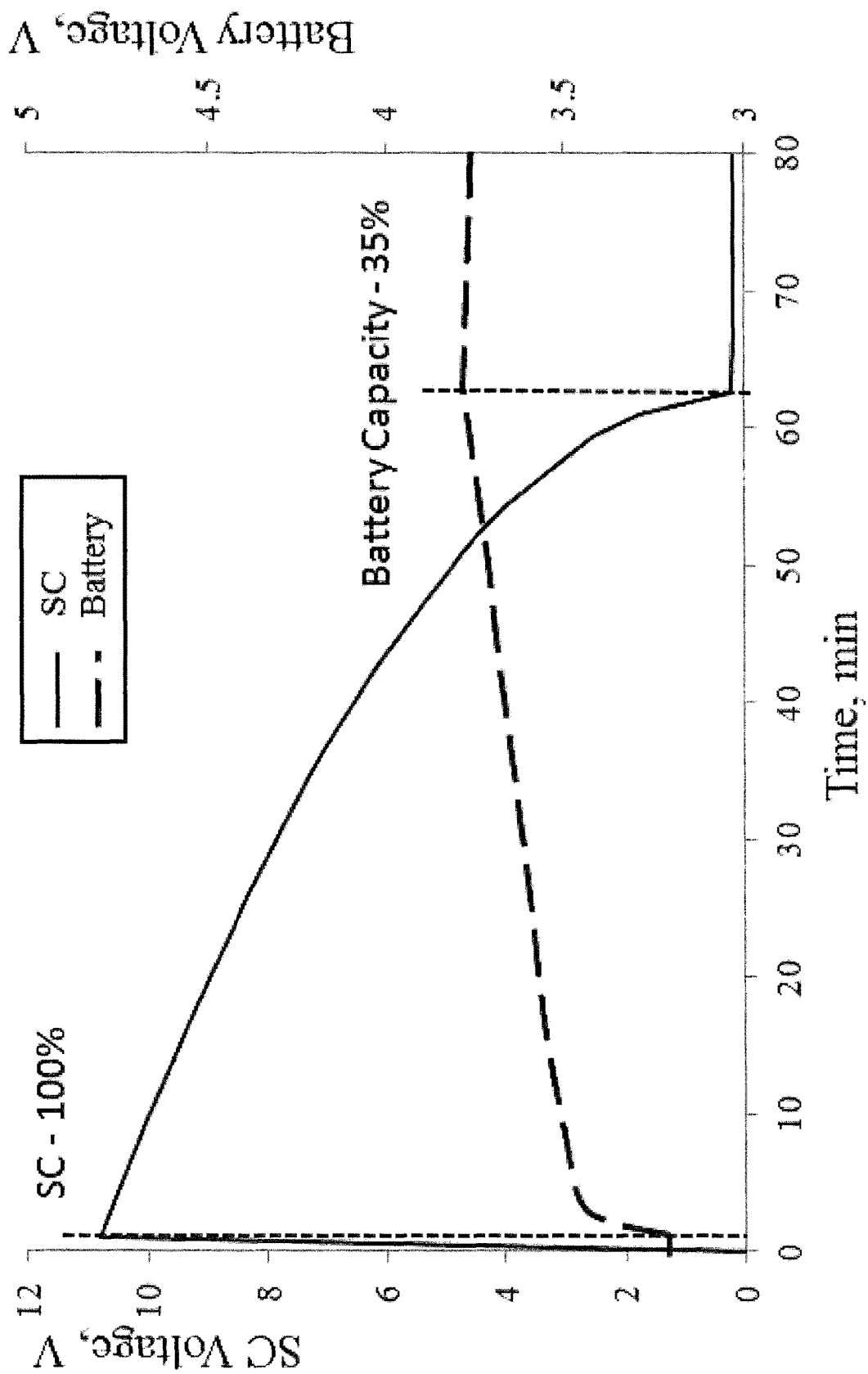
FIG. 10 is a graph of a FlashBattery charge/discharge simulation in accordance with the simulation parameters of Table 4, according to preferred embodiments of the present invention.

FIG. 10 is a graph of a FlashBattery charge/discharge simulation in accordance with the simulation parameters of Table 4, according to preferred embodiments of the present invention. The low-current mode may be applied during standby time when a device is idle in order to save battery lifetime.

TABLE 5

Charge/discharge simulation parameters of FlashBattery system, 100% charged from external charger, with battery charged in rapid mode using 1000 mA (Simulation #5).

| Time | SC Charging Controller | Battery Charging Controller | Device Interface Controller | SC/Battery |
|---|---|---|---|---|
| t = 0 | External charger: IN | Battery charging: OFF | Load current from charger - 200 mA | SC = 0%, Batt = 0% |
| t = 60 sec | External charger: IN | Battery charger: ON - 1000 mA | Load current from charger - 200 mA | SC = 100%, Batt = 0% |
| t = 101 min | External charger: OUT | Battery charging: OFF | Load current from SC - 200 mA | SC = 100%, Batt = 100% |
| t >101 min | External charger: OUT | Battery charging: OFF | Load current from SC - 200 mA | SC <100%, Batt = 100% |

Figure 11:
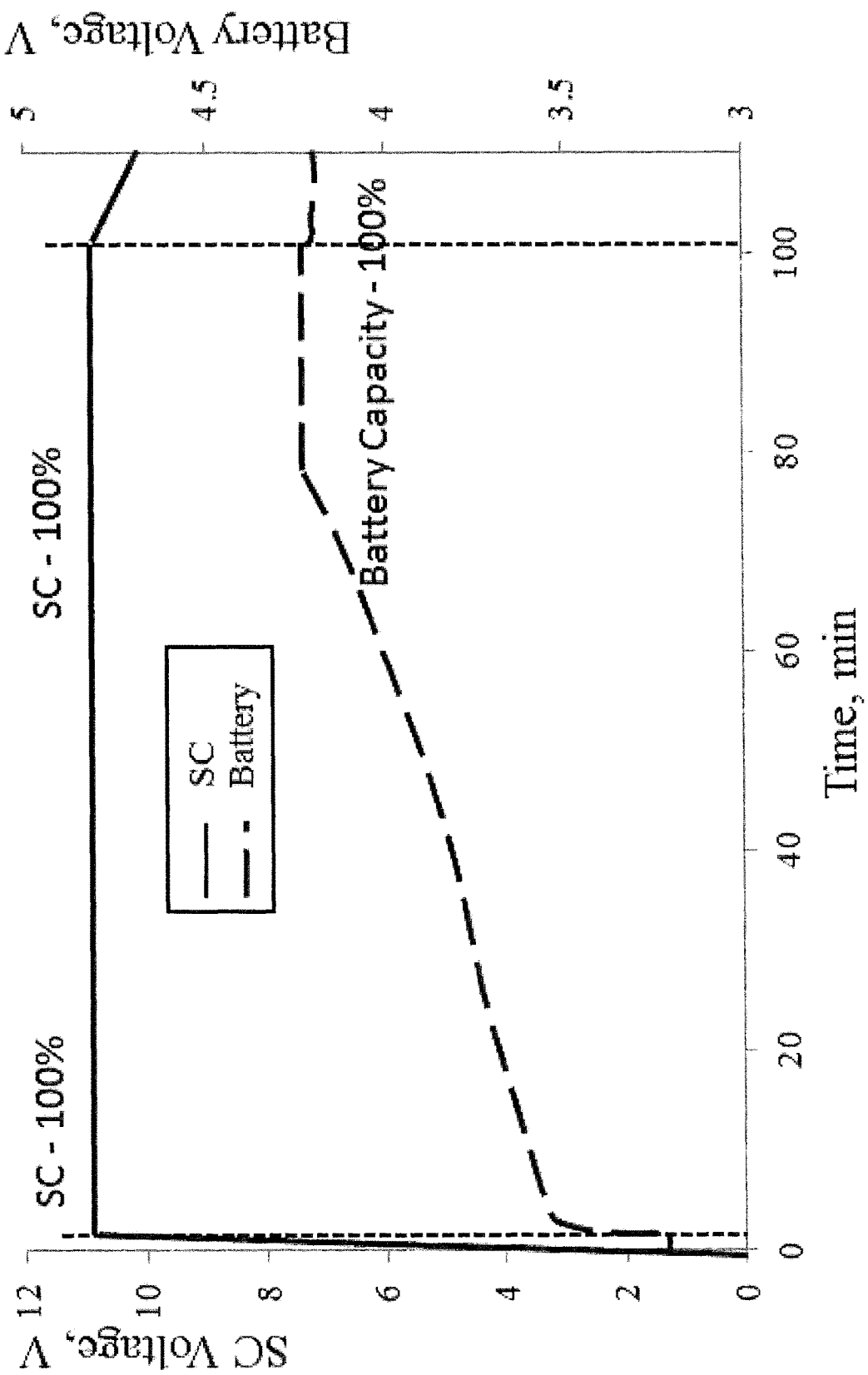
FIG. 11 is a graph of a FlashBattery charge/discharge simulation in accordance with the simulation parameters of Table 5, according to preferred embodiments of the present invention.

FIG. 11 is a graph of a FlashBattery charge/discharge simulation in accordance with the simulation parameters of Table 5, according to preferred embodiments of the present invention.

Simulation Summary Table 6 compares the results from the FlashBattery system with a standard cell-phone battery.

TABLE 6

Charge/discharge simulation parameters of FlashBattery system with combination SC and battery configuration.

| Performance Parameters | Standard Cell-phone battery (2500 mAh) | SC (3 Wh) & Battery (1500 mAh) |
|---|---|---|
| Charging time | 2.5-4 hrs. | 60 sec. |
| Operation time (200 mA constant load) | ~11 hrs. | ~3.5 hrs. |
| Recharge interval | <11 hrs. | ~35 min. (after SC discharge) |
| Operation time after recharge (200 mA constant load) | <11 hrs. | 3.5-11 hrs. |

In such a case, the FlashBattery system provides device power from an SC and battery with flexible and convenient adaptive fast-charging capabilities, resulting in long operation time. Moreover, smart battery charging is enabled by controlling the current, allowing adaptation of the system to user requirements.

In some embodiments, devices having intermittent power source connectivity can include a fast charging battery cell having a first charge rate that is coupled to a secondary battery having a second charge rate. The first charge rate can be less than the second charge rate. In some embodiments, the first charge rate can be greater than the second charge rate. The fast charging battery cell can receive power from an external power source at the first charge rate, and then provide power to the second battery at the second charge rate. The first charge rate can be higher than the second charge rate of the second battery. For example, the first charge rate can be 5 C to and/or the second charge rate can be 0.5 C to 1 C. In this manner, a device can be quickly charged when connected to an external power source due to, for example, the fast charging battery cell, and/or simultaneously allow for the fast charging battery cell to have less capacity and/or be less expensive than current devices that only include a fast charging battery cell.

Some embodiments of the invention can enable adaptive fast-charging of mobile devices and/or devices having a sporadic power-source. The invention can include a charging apparatus that includes a high-power fast charging battery cell that can be charged to a first charge capacity (e.g., about 70% of rated capacity of the fast charging battery cell) in a first time period (e.g., 5 minutes), or second charge capacity (e.g., about 95% of rated capacity of the fast charging battery cell) in a second time period (e.g., 30 minutes), or third charge capacity (e.g., about 100% of rated capacity of the fast charging battery cell) for more than a third time period (e.g., 30 min). The fast charging battery cell can be coupled to other rechargeable batteries. This can allow for higher system power, while preserving energy density of the overall system level battery in a device-compatible form factor.

In some embodiments, the first, second and/or third charge capacity is based on specifications (e.g., voltage level) of the fast charging battery cell and/or the rechargeable batteries. In various embodiments, the number of segments and the capacity and/or time period of each segment is configurable.

In some embodiments, the fast charging battery cell is of the same type as the rechargeable battery.

Figure 12:
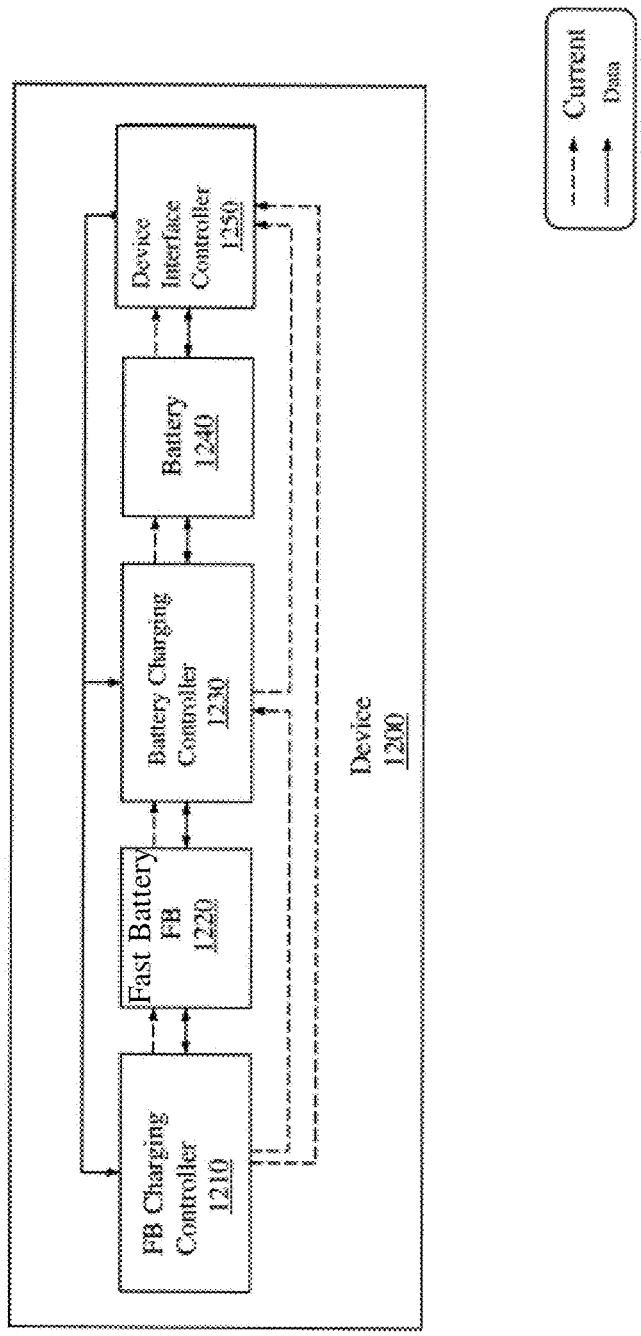
FIG. 12 is a schematic diagram of an architecture for a device for providing power to the device, according to an illustrative embodiment of the invention.

FIG. 12 is a schematic diagram of an architecture for a device 1200 for providing power to the device, according to an illustrative embodiment of the invention. The device 1200 includes a fast charging battery cell (FB) controller 1210, a FB 1220, a secondary battery controller 1230, a secondary battery 1240, and a device interface controller 1250.

The FB controller 1210 is coupled to the FB 1220, the secondary battery controller 1230, and the device interface controller 1250 via current and data connections. The secondary battery controller 1230 is coupled to the secondary battery 1240, the FB charging controller 1210, and the device interface controller 1250 via current and data connections. In some embodiments, the FB 1220 is a battery as is described in U.S. patent application Ser. No. 14/926,012 filed on Oct. 29, 2015, incorporated herein by reference it its entirety.

In some embodiments, the FB 1220 is a battery as is described in U.S. patent application Ser. No. 14/926,012 filed on Oct. 29, 2015, now U.S. Pat. No. 9,472,804, incorporated herein by reference it its entirety, and teaching, e.g., germanium and/or silicon as the active materials for the fast battery.

In some embodiments, the secondary battery controller 1230 includes an analog to digital converter, a current source and/or a power source. In some embodiments, the secondary battery controller 1230 includes elements as are known in the art to control power.

In some embodiments, the FB controller 1210 and the secondary battery controller 1230 are positioned in the same chip. In some embodiments, the FB controller and the secondary battery controller are positioned on separate chips.

Figure 12A:
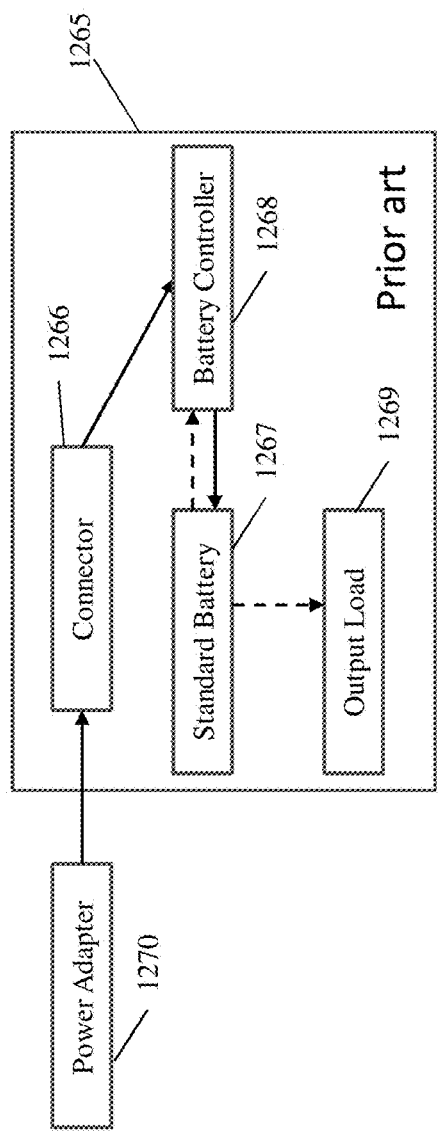
FIG. 12A is an example of an existing device, according to the prior art.
Figure 12B:
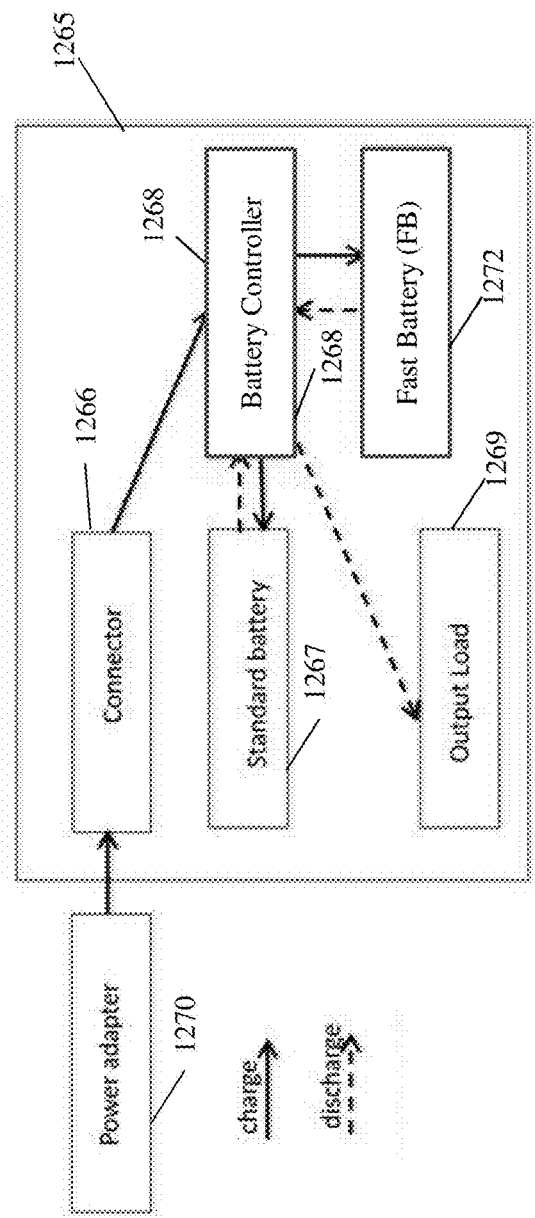
FIG. 12B is an example of an existing device having a fast battery added, in accordance with embodiments of the invention.

In some embodiments, the FB 1220 and the FB controller 1210 are positioned within a device having a battery, a controller, and a load. For example, the FB 1220 and the FB controller 1210 can be positioned within an existing power tool, electric vehicle, laptop and/or other devices having batteries that need to be charged and supply power to a load. FIG. 12A is an example of an existing device 1265. The existing device 1265 includes a connector 1266, a standard battery 1267, a battery controller 1268, and an output load 1269. In some scenarios, the output load 1269 can be a battery pack. The battery pack can include multiple numbers of cell in serial and/or parallel connection. The battery pack can be a rechargeable battery that can include one or more cells, modules and/or packs. Each pack can include several modules. Each module can include several cells. The existing device 1265 can be coupled to a power adapter 1270. FIG. 12B is an example of the existing device 1265 having a fast battery 1272 added. The battery controller 1275 can be modified to include a fast battery controller (e.g., the fast battery controller 1210).

In some embodiments, the FB 1220 can receive power from a power adapter of the existing device, and output power to the load and/or to the battery at a charge rate and power that is specific to the existing device. The FB 1220 can have an energy that is dependent upon charge rate. For example, Table 6A shows for various devices with a FB 1220 having various charge rates, the time at which the FB 1220 can be charged.

TABLE 6A

| Device | Charge Rate | Time to Charge |
|---|---|---|
| Device 1 | 10 C | 6 minutes |
| Device 2 | 60 C | 1 minutes |
| Device 3 | 12 C | 5 minutes |
| Device 4 | 6 C | 10 minutes |

For example, Table 6B shows examples for various existing devices, having specific power adapters and existing batteries, the battery energy of the FB 1220.

TABLE 6B

| Device | Power Adapter | Standard (existing) battery | FB 1220 | Energy addition |
|---|---|---|---|---|
| Device 1 | 70 W | 54 Wh (3 Ah@18 V) | 7 Wh (~0.4 Ah@18 V) | ~13% |
| Device 2 | 70 W | 54 Wh (3 Ah@18 V) | 1.2 Wh (~0.07 Ah@18 V) | ~2% |
| Device 3 | 120 kW (super charger) | 80 kWh (200 Ah@400 V) | 110 kWh (25 Ah@400 V) | 12.5% |
| Device 4 | 65 W | 55 Wh (~15 Ah@14.8 V) | 10.8 Wh (0.73 Ah@14.8) | ~20% |

As can be seen in Table 6B, the FB 1220 can provide a percentage of additional energy for each device.

During operation, the FB controller 1210 can control charging and/or discharging of the FB 1210. The FB controller 1210 can also transmit data (e.g., charge state of the FB 1210) for the battery charging controller 1230 and/or the device interface controller 1250. The secondary battery charging controller 1230 can control charging and/or discharging of the secondary battery 1240.

The FB controller 1210 and the secondary battery charger controller 1230 can control charging and/or discharging in accordance with the methods described in FIG. 13, FIG. 14, FIG. 15 and/or FIG. 16, as are described in further detail below.

Figure 13:
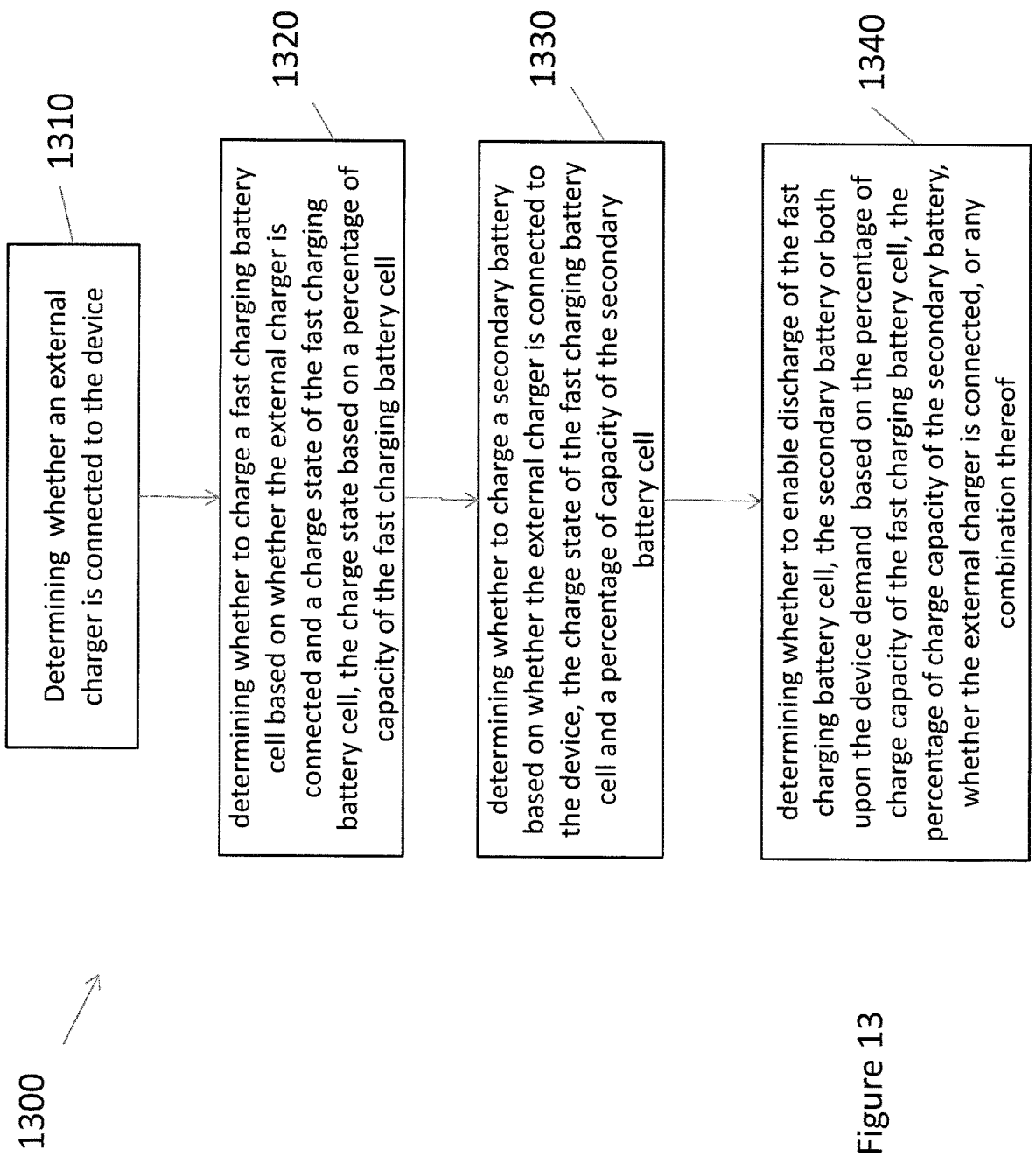
FIG. 13 is a flowchart of a method for providing power to a device, according to an illustrative embodiment of the invention.

FIG. 13 is a flowchart 1300 of a method for providing power to a device (e.g., device 1200 as described above in FIGS. 12 and 12B), according to an illustrative embodiment of the invention. The method involves determining whether an external charger is connected to the device (Step 1310). The external charger can include a connection to an AC wall outlet, a connection to an external battery source, or any combination thereof.

The method also involves determining whether to charge a FB (e.g., FB 1220 as described above in FIG. 12B) based on whether the external charger is connected and a charge state of the FB (Step 1320). The charge state can be based on a percentage of charge capacity of the FB (e.g., voltage in the FB), a temperature of the FB, a resistance of the FB, and/or an amount of an input from the external charger.

The method also involves determining whether to charge a secondary battery (e.g., secondary battery 1240 as described above in FIGS. 12 and 12B) based on whether the external charger is connected to the device, a charge state of the FB, and a charge state of the secondary battery (Step 1330). The charge state of the secondary battery can be based on a percentage of charge capacity of the secondary battery, a temperature of the secondary battery, a resistance of the secondary battery, and/or an amount of an input from the external charger.

The method also involves determining whether to discharge the FB cell, the secondary battery or both to the device based on the percentage of charge capacity of the fast charging battery cell (e.g., voltage in the secondary battery), the percentage of charge capacity of the secondary battery, whether the external charger is connected, or any combination thereof (Step 1340).

Figure 14:
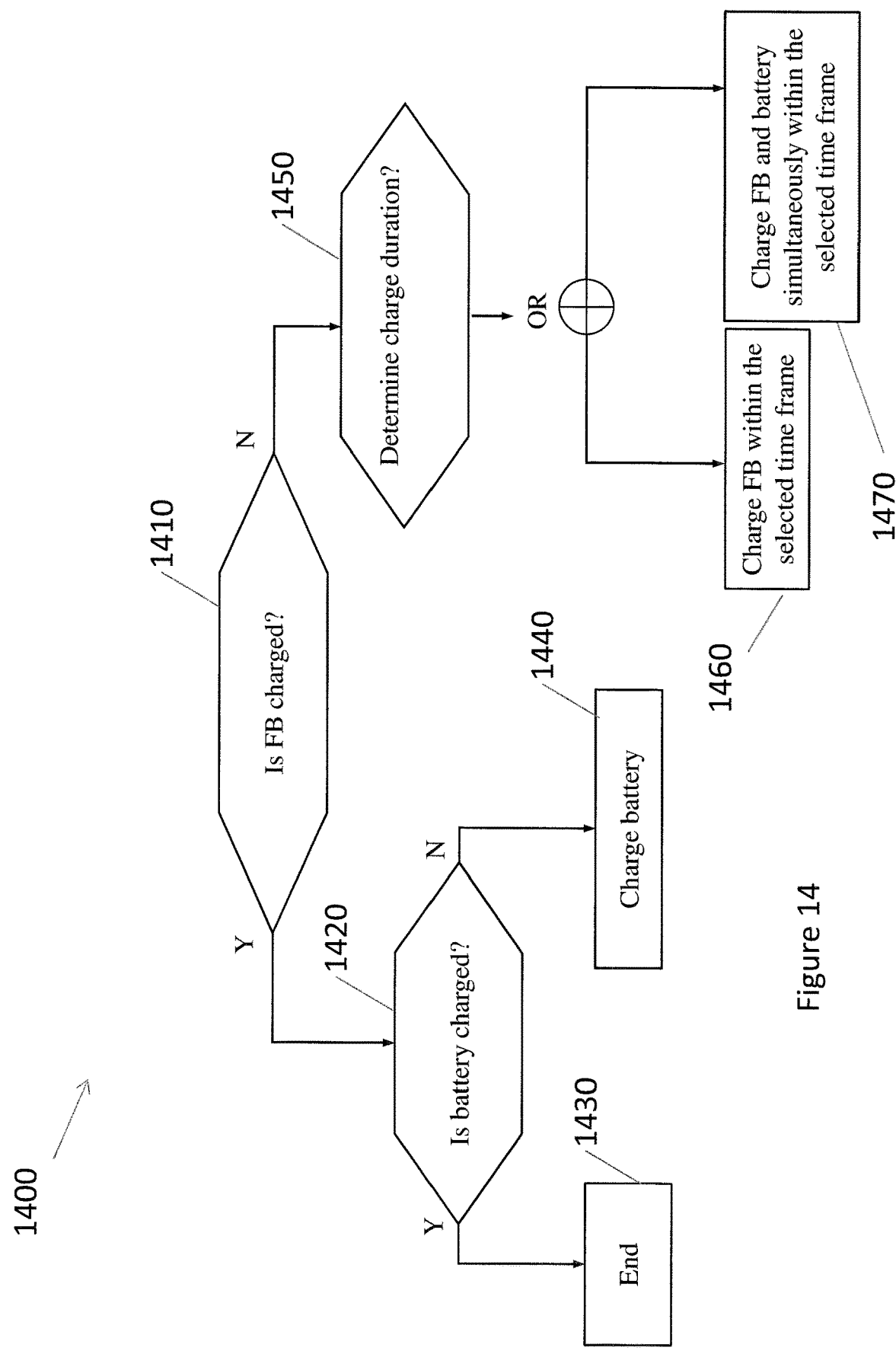
FIG. 14 is a flowchart of a method for charging batteries of a device when the device is connected to an external power source, according to an illustrative embodiment of the invention.
Figure 15:
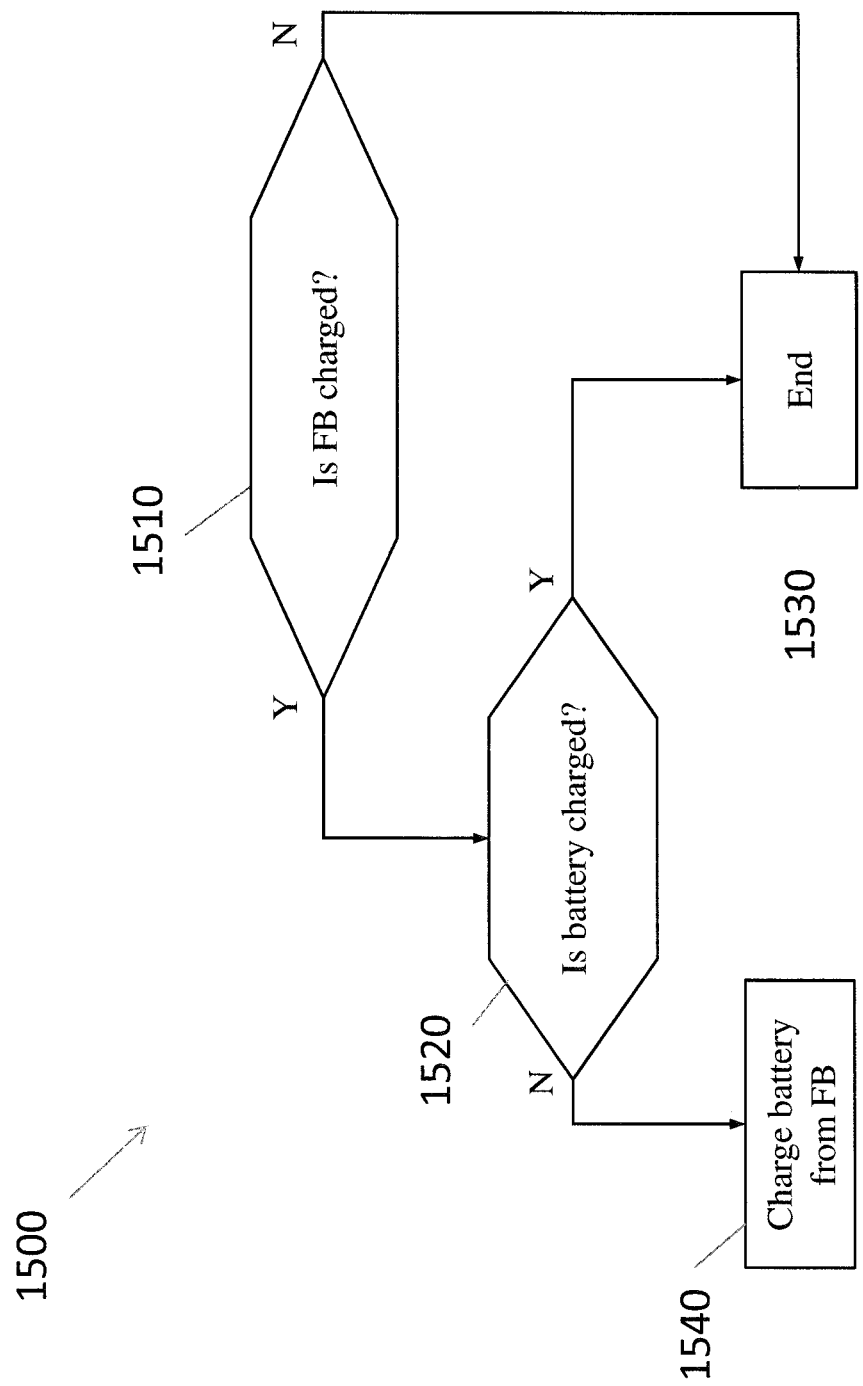
FIG. 15 is a flowchart of a method for charging batteries of a device when the device is not connected to an external power source, according to an illustrative embodiment of the invention.

FIG. 14 is a flowchart of a method 1400 for charging batteries of a device (e.g., device 1200 as described above in FIGS. 12 and 12B) when the device is connected to an external power source, according to an illustrative embodiment of the invention. The method involves determining if a FB (e.g., FB 1220 as described above in FIGS. 12 and 12B) of the device is charged (Step 1410). The determination can be performed by an FB controller (e.g., FB controller 1210, as described above in FIGS. 12 and 12B). The determination can be based on a percentage of charge capacity of the FB (e.g., voltage in the FB), a temperature of the FB, a resistance of the FB, and/or an amount of an input from the external charger.

The method also involves, if the FB is charged, then determining whether a secondary battery (e.g., secondary battery 1240 as described above in FIGS. 12 and 12B) of the device is charged (Step 1420). The determination can be based on a percentage of charge capacity of the secondary battery, a temperature of the secondary battery, a resistance of the secondary battery, and/or an amount of an input from the external charger.

The method also involves, if the secondary battery is charged, the method can end (Step 1430). If the secondary battery not charged, then the secondary battery can be charged (Step 1440). In some embodiments, the secondary battery is charged for a predetermined time. For example, a user may specify a charge duration of 20 minutes. In this example, the secondary battery is charged for 20 minutes or until the secondary batter is fully charged, whichever comes first. In some embodiments, the secondary battery is charged to reach a predetermined percentage of its charge capacity. For example, a user may specify that the secondary battery be charged to 90% of its charge capacity. In this example, the predetermined percentage of its charge capacity is 90%. In some embodiments, the predetermined percentage is based on a type of the secondary battery. In some embodiments, the predetermined percentage is based on preserving the lifetime of the secondary battery.

The method also involves, if the FB is not charged, determining a charge duration (e.g., a number of minutes to fully charged), then it may be desirable to only charge the FB such that the FB is charged to its fullest capacity.

In some embodiments, an amount of current needed to charge the FB within the time duration may be less than the total current available from an external charger. In these embodiments, the FB and the secondary battery can be charged simultaneously.

In some embodiments, an amount and/or time duration to charge the FB and/or secondary capacity can be based on a charge duration as specified as shown in Table 7 below.

TABLE 7

| Charge Duration | FB fully discharged (e.g., below 6% charged) | FB partially discharged (e.g., below 50% charged) | FB fully charged (e.g., above 94% charged) |
| --- | --- | --- | --- |
| 5 Minutes | Charge the FB to 70% of capacity, OR charge FB and the secondary battery | Charge the FB to 70% of capacity without charging the secondary battery and then charge the secondary battery with low current for the rest of the time if needed (up to 5 minutes) | Charge the secondary battery with low current for 5 minutes or up to 100% of the secondary battery capacity |
| 30 Minutes | Charge the FB to 95% OR charge FB and the battery | Charge the FB to 95% of capacity without charging secondary the battery and then charge the secondary battery with low current for the rest of the time if needed (e.g., up to 30 minutes) | Charge the battery with low current for 30 minutes or up to 100% of the battery capacity |
| More than 30 minutes | Charge the FB to 100% OR charge FB and the secondary battery | Charge the FB to 100% of capacity, without charging the battery and then charge the secondary battery with low current for the rest of the time if needed (up to 30 minutes) | Charge the battery with low current for more than 30 minutes or up to 100% of the secondary battery capacity | charge) (Step 1450). In some embodiments, the charge duration is input by a user. The method also involves i) charging the FB (Step 1460) or ii) charging the FB and the secondary battery within the number of minutes to charge (Step 1470). In some embodiments, the charge duration is based on a type battery of the FB, a type of battery of the secondary battery, or any combination thereof. In some embodiments, the charge duration substantially equals an amount of time it takes for the FB to charge. In some embodiments, the time duration is longer than the duration it takes to charge the FB. In this embodiment, a cycle life of the FB can be extended.

In some embodiments, whether to charge the FB or charge both the FB and the secondary battery is based on the time duration, the percentage of charge capacity of the FB, and/or the percentage of charge capacity of the secondary battery. For example, a user may only have a certain time duration for the charging (e.g., a user may need to board a train in 10 minutes). In this example, it may take longer than 10 minutes to charge the FB and the secondary battery to their fullest charge capacity, however it may be possible to charge the FB to its fullest capacity. In this example, if the secondary battery has a percentage of charge capacity that is greater than a predefined threshold (e.g., fully charged or almost FIG. 15 is a flowchart of a method 1500 for charging batteries of a device (e.g., device 1200 as described above with respect to FIGS. 12 and 12B) when the device is not connected to an external power source, according to an illustrative embodiment of the invention. The method 1500 involves determining if a FB (e.g., FB 1220 as described above in FIGS. 12 and 12B) of the device is charged (Step 1510). The determination can be based on a percentage of charge capacity of the FB, as described above with respect to FIG. 14.

The method also involves, if the FB is charged, determining whether a secondary battery (e.g., secondary battery 1240 as described above in FIGS. 12 and 12B) of the device is charged (Step 1520). The determination can be based on a percentage of charge capacity of the secondary battery, as described above with respect to FIG. 14. The method also involves ending the method if the secondary battery is charged (Step 1530). The method also involves charging the secondary battery if the secondary battery is not charged (Step 1540).

The method also involves if the FB is not charged ending the method (Step 1540). In this manner, when the device is not connected to an external power source, the FB, if charged can provide power to the secondary battery to power the device.

Figure 16:
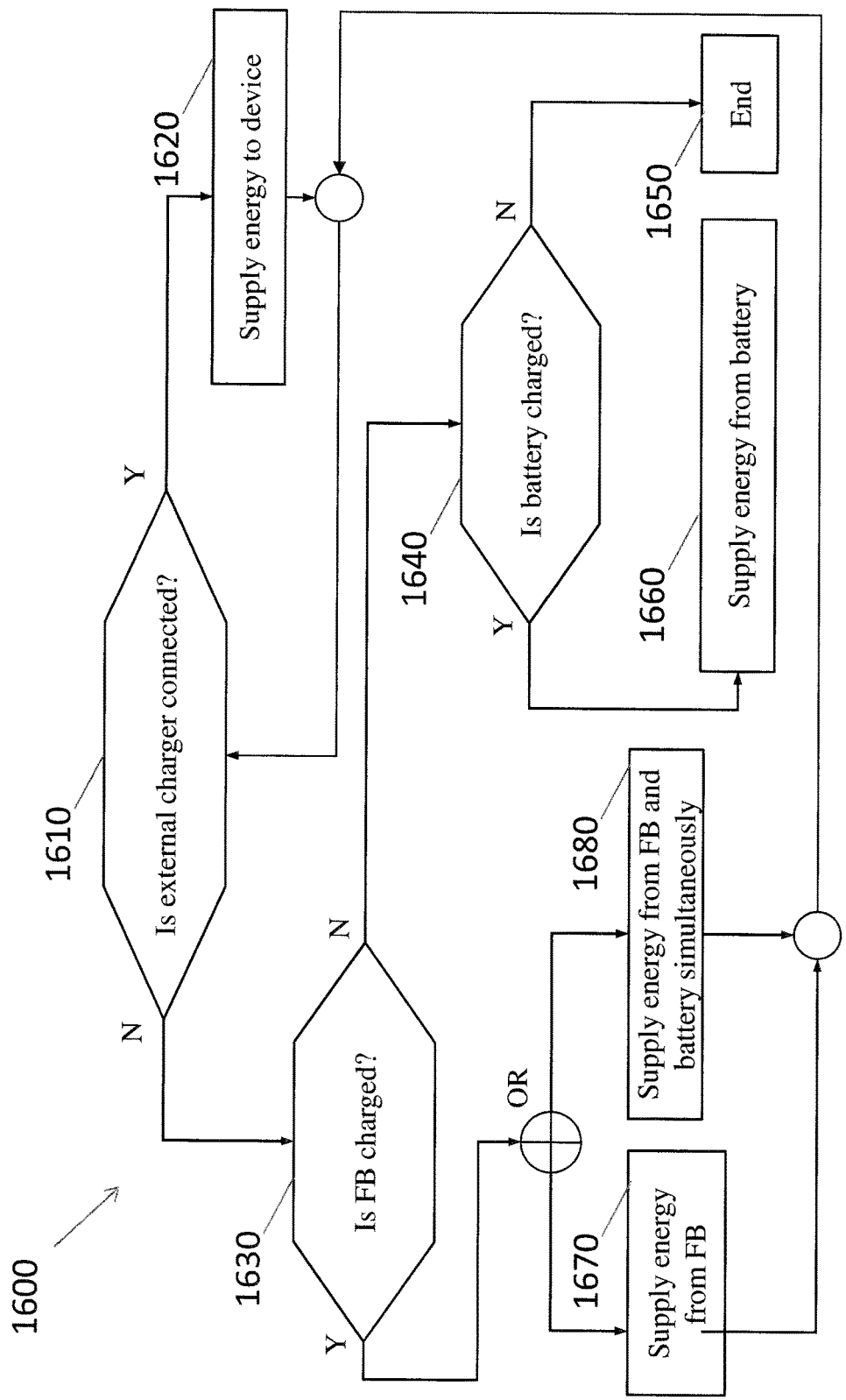
FIG. 16 is a flowchart of a method for discharging power to a device, according to an illustrative embodiment of the invention.

FIG. 16 is a flowchart of a method 1600 for discharging power to a device (e.g., device 1200 as described above with respect to FIGS. 12 and 12B), according to an illustrative embodiment of the invention. The method involves determining if an external charger is connected to the device (Step 1610).

The method also involves, if an external power source is connected, then supply power to the device from the external power source (Step 1620). The method also involves determining if a FB of the device is charged (Step 1630). The determination can be based on a percentage of charge capacity of the FB, as described above with respect to FIG. 14.

The method can also involve, if the FB is not charged, determining if a secondary battery (e.g., secondary battery 1240 as described above in FIGS. 12 and 12B) of the device is charged (Step 1640). The determination can be based on a percentage of charge capacity of the secondary battery, as described above with respect to FIG. 14. The method can also involve, ending the method if the secondary battery is not charged (Step 1650). The method can also involve, if the secondary battery is charged, supplying power from the secondary battery to the device (Step 1660).

In some embodiments, if the secondary battery is not charged, the FB discharges its charge to the secondary battery. In some embodiments, the discharge is performed as rapidly as possible by controlling a current to the secondary battery. The max discharge current of the fast charging battery cell can be, for example: $I_{max\_dsch}=0.5\ C_{RB}$+current consumption of the device each moment, where $C_{RB}$ is the charge capacity of rechargeable battery.

The method can also involve, if the FB is charged, i) supplying power from the FB to the device (Step 1670), or ii) supplying power from the FB and the secondary battery (Step 1680). In some embodiments, whether to supply power from the FB or the FB and secondary battery is based on a percentage of charge capacity of the FB and the secondary battery, respectively. For example, if the secondary battery has a percentage of charge capacity that is less than a predefined threshold (e.g., 5%), then power can be supplied from the FB only. In another example, if a load of the device is greater than percentage of charge capacity left in the FB, then the power can be supplied from the FB and the secondary battery. For example, the FB and the secondary battery can each include regions of the cell that are ideal for extracting energy from to preserve a lifetime of the battery. In this example, it can be desirable to pull energy from both batteries such that energy is pulled from the ideal regions first. In some embodiments, power supplied from the FB and/or secondary battery is determined as shown in Table 8 below.

TABLE 8

| Time | FB Charging Controller | Battery Charging Controller | Device Interface Controller | FB/Battery |
|---|---|---|---|---|
| t = 0 | External charger: IN 1st segment selected (5 min time frame) | Battery charging: OFF | Load current from external charger | FB = 0%, Batt = 0% |
| t = 5 min | External charger: OUT | Battery charging: ON - 300 mA | Load current from FB - 200 mA | FB = 70%, Batt = 0% |
| t ~185 min | External charger: OUT | Battery charging: OFF | Load current from battery - 200 mA | FB ~0% Batt ~23% |
| t ~290 min | External charger: IN 2nd segment selected (30 min time frame) | Battery charging: ON - 300 mA | Load current from external charger | FB ~0% Batt = 0% |
| t ~320 min | External charger: OUT | Battery charging: ON - 300 mA | Load Current from battery - 200 mA | FB = 95%, Batt = 40% |
| t ~605 min | External charger: OUT | Battery charging: OFF | Load current from battery - 200 mA | FB ~0% Batt ~48% |

Table 8 shows an example of various powers supplied for a FB and secondary battery have an equal capacity of 100 mAmps over time. Assuming initial conditions of the FB and the secondary battery are not charged, an external charger is connected and the device receives current from the external charger. After 5 minutes of being connected to the external charger, assuming the external charger is removed, the FB is at 70% charging capacity, the secondary battery is not charged. The secondary battery controller turns on Assuming the device has a load of ~200 mA, the FB provides ~200 mA to the secondary battery and 300 mA to the secondary battery. After another 180 minutes (t=185 minutes), assuming the external charger has not been reconnected, the FB is not charged, the secondary battery has 23% capacity and the secondary battery provides ~200 mA to the secondary battery. As is apparent to one of ordinary skill in the art, the percentage that the FB and secondary battery are charged and/or discharged depends on the load of the device, and the current provided by the external charger.

While the present invention has been described with respect to a limited number of embodiments, it will be appreciated that many variations, modifications, and other applications of the present invention may be made.

What is claimed is:

1. A method for supplying power to a device when a power-source connection is sporadic, the method comprising:
  (a) determining whether an external charger is connected to the device;
  (b) determining whether to charge a fast charging battery cell that is internal to the device based on whether the external charger is connected and a charge state of the fast charging battery cell, the charge state based on a percentage of charge capacity of the fast charging battery cell;
  (c) determining whether to charge a secondary battery that is internal to the device based on whether the external charger is connected to the device, the charge state of the fast charging battery cell and a percentage of charge capacity of the secondary battery; and (d) determining whether to enable discharge of the fast charging battery cell, the secondary battery or both upon the device demand based on the percentage of charge capacity of the fast charging battery cell, the percentage of charge capacity of the secondary battery, whether the external charger is connected, or any combination thereof, wherein the fast charging battery cell has a first charging rate that is higher than a second charging rate of the secondary battery, the fast charging battery cell is serially connected to a battery charging controller, and the battery charging controller is serially connected to the secondary battery, and wherein the method further comprises charging the fast charging battery cell from the external charger at the first charging rate whenever both are available for charging, and charging the secondary battery at the second charging rate from the fast charging battery cell, wherein the charging of the secondary battery and of the fast charging battery and power provided to the device are controlled according to the determining steps (a)-(d).

2. The method of claim 1, wherein charging the fast charging battery cell or charging the secondary battery cell further comprises charging the fast charging battery cell or charging the secondary battery cell for a predetermined time, to a predetermined capacity, or any combination thereof.

3. The method of claim 2, wherein the predetermined time, the predetermined capacity, or both is input by a user of the device.

4. The method of claim 2, wherein charging the fast charging battery cell further comprises: receiving the predetermined charge time from user input, a computer file, or any combination thereof.

5. The method of claim 2, wherein charging the fast charging battery cell further comprises: receiving the predetermined capacity from user input, a computer file, or any combination thereof.

6. The method of claim 1, wherein if the external charger is connected the fast charging battery cell and the secondary battery are not discharged.

7. The method of claim 1, wherein if the external charger is not connected and the fast charging battery cell is at least partially charged, then a percentage to discharge the fast charging battery cell and percentage to discharge the secondary battery is based on a predetermined time duration.

8. The method of claim 1, wherein the fast charging battery cell is of a same type as the secondary battery.

9. The method of claim 1, further comprising positioning the fast charging battery cell within the device and configuring the fast charging battery cell to have a device-compatible form factor.

10. The method of claim 1, wherein the fast charging battery cell has active material that is based on germanium and/or on silicon.

11. A system for charging a device when a power-source connection is sporadic, the system comprising:

a fast charging battery cell coupled to the device, internal to the device and to receive a charge from an external power source;

a fast charging battery cell controller coupled to the fast charging battery cell to control an amount of current supplied to the fast charging battery cell;

a secondary battery coupled to the fast charging battery cell and the device, the secondary battery to receive current from the fast charging battery cell and to provide current to the device;

a secondary battery controller coupled to the fast charging battery cell controller and the secondary battery to control an amount of current supplied to the secondary battery, wherein the fast charging battery cell has a first charging rate that is higher than a second charging rate of the secondary battery, the fast charging battery cell is serially connected to the fast charging battery cell controller, and the secondary battery controller is serially connected to the secondary battery, wherein the fast charging battery cell controller is further configured to charge the fast charging battery cell from the external charger whenever both are available for charging, and charge the second battery at the second charging rate from the fast charging battery cell, and wherein the fast charging battery cell controller and the secondary battery controller are configured to manage the charging of the secondary battery and of the fast charging battery based on whether the external charger is connected, a charge state of the fast charging battery cell, a percentage of charge capacity of the secondary battery, or any combination thereof.

12. The system of claim 11, wherein the fast charging battery cell is configured to receive a charge rate of at least 5 C.

13. The system of claim 11, wherein the fast charging battery cell controller and the secondary battery controller are positioned in the same chip.

14. The system of claim 11, wherein the fast charging battery cell is of a same type as the secondary battery.

15. The system of claim 11, wherein the fast charging battery cell is positioned within the device and has a device-compatible form factor.

16. The system of claim 11, wherein the fast charging battery cell has active material that is based on germanium and/or on silicon.

17. The system according to claim 11 comprising a device interface controller.

18. The system according to claim 17 wherein the fast charging battery cell is serially connected between the fast charging battery cell controller and the secondary battery controller, wherein the secondary battery is serially connected to the device interface controller.

19. The system according to claim 17 wherein the fast charging battery cell controller, and the secondary battery controller and the device interface controller are operationally connected to each other.

20. The system according to claim 17, wherein the device interface controller, the secondary battery controller, and the fast charging battery cell controller are configured to manage the charging of the secondary battery, the charging of the fast charging battery cell, and a power provided to the device.

\* \* \* \* \*